(12) United States Patent
Kim et al.

(10) Patent No.: US 10,671,343 B1
(45) Date of Patent: Jun. 2, 2020

(54) GRAPHICAL INTERFACE TO PREVIEW FUNCTIONALITY AVAILABLE FOR SPEECH-ENABLED PROCESSING

(71) Applicant: Amazon Technologies, Inc., Seattle, WA (US)

(72) Inventors: Andy Kim, Irvine, CA (US); John Botros, Newport Beach, CA (US)

(73) Assignee: Amazon Technologies, Inc., Seattle, WA (US)

( * ) Notice: Subject to any disclaimer, the term of this patent is extended or adjusted under 35 U.S.C. 154(b) by 822 days.

(21) Appl. No.: 15/198,613

(22) Filed: Jun. 30, 2016

(51) Int. Cl.
*G06F 3/16* (2006.01)
*G10L 13/033* (2013.01)
*H04B 1/3827* (2015.01)
*H04L 29/08* (2006.01)
*G06F 3/0482* (2013.01)

(52) U.S. Cl.
CPC ............ *G06F 3/167* (2013.01); *G06F 3/0482* (2013.01); *G10L 13/033* (2013.01); *H04B 1/3833* (2013.01); *H04L 67/306* (2013.01)

(58) Field of Classification Search
CPC ..... G06F 3/167; H04L 67/306; G10L 13/033; H04B 1/3833
See application file for complete search history.

(56) References Cited

U.S. PATENT DOCUMENTS

| | | | | |
|---|---|---|---|---|
| 7,197,460 B1 * | 3/2007 | Gupta | ..................... | G06F 3/167 704/270.1 |
| RE43,031 E * | 12/2011 | Isaka | ...................... | G06Q 10/10 704/1 |
| 10,089,983 B1 * | 10/2018 | Gella | ...................... | G10L 15/22 |
| 10,332,513 B1 * | 6/2019 | D'Souza | .................. | G10L 15/22 |
| 2002/0010715 A1 * | 1/2002 | Chinn | .................. | G06F 16/957 715/236 |
| 2002/0035474 A1 * | 3/2002 | Alpdemir | ............... | G06Q 30/02 704/270 |

(Continued)

OTHER PUBLICATIONS

Badcock, Corey. First Alexa Third Party Skills Now Available for Amazon Echo. Posted to Alexa Blogs on Aug. 17, 2015. Retrieved from [https://developer.amazon.com/blogs] on [Mar. 1, 2019]. 4 pages. (Year: 2015).*

(Continued)

*Primary Examiner* — Amy M Levy
(74) *Attorney, Agent, or Firm* — Pierce Atwood LLP

(57) ABSTRACT

Methods and devices for sampling applications using a touch input are described herein. In some embodiments, an electronic device detects a touch input, which may cause the electronic device to send identifiers to a backend system. The backend system may then determine an application and sample audio request associated with the received identifiers. The backend system may then receive text data representing the sample audio request and text data representing a response to the sample audio request. The backend system may generate audio data representing the received text data and send the audio data to the electronic device. If, the touch input is still occurring, the backend system may find and send more sample audio requests and the responses thereof. If the touch input stops occurring during the sample, the backend system may send instructions to the electronic device to stop outputting the sample.

19 Claims, 10 Drawing Sheets

(56) References Cited

U.S. PATENT DOCUMENTS

| | | | |
|---|---|---|---|
| 2003/0023435 A1* | 1/2003 | Josephson | G10L 15/26 704/235 |
| 2004/0234047 A1* | 11/2004 | Ciccarelli | H04M 3/527 379/88.16 |
| 2011/0138284 A1* | 6/2011 | Wigdor | G06F 3/0488 715/727 |
| 2012/0016678 A1* | 1/2012 | Gruber | G10L 15/22 704/275 |
| 2013/0031476 A1* | 1/2013 | Coin | G06F 16/90332 715/706 |
| 2013/0275164 A1* | 10/2013 | Gruber | G10L 17/22 705/5 |
| 2013/0275528 A1* | 10/2013 | Miner | H04L 51/18 709/206 |
| 2014/0242955 A1* | 8/2014 | Kang | G06F 17/289 455/414.1 |
| 2014/0314225 A1* | 10/2014 | Riahi | G06Q 30/02 379/265.09 |
| 2014/0359523 A1* | 12/2014 | Jang | G06F 3/167 715/781 |
| 2015/0066510 A1* | 3/2015 | Bohrer | G10L 13/043 704/260 |
| 2016/0034260 A1* | 2/2016 | Ristock | G06F 8/34 717/109 |
| 2016/0260436 A1* | 9/2016 | Lemay | G10L 15/28 |
| 2017/0097744 A1* | 4/2017 | Forstall | G06F 8/61 |
| 2017/0185375 A1* | 6/2017 | Martel | G06F 3/167 |
| 2018/0032997 A1* | 2/2018 | Gordon | G06Q 20/3224 |

OTHER PUBLICATIONS

Testing your Alexa Skill with cURL (KB_2011). Knowledge base entry posted Apr. 15, 2015 by Amelia@Amazon (/users/2492/brizzlebrazzle.html), edited Nov. 1, 2017 by Brian@Amazon (/users/40665/Brian%40Amazon.html). Retrieved from Alexa Skills Kit Knowledge Base on Mar. 1, 2019. 4 pages. (Year: 2015).*

* cited by examiner

US 10,671,343 B1

GRAPHICAL INTERFACE TO PREVIEW FUNCTIONALITY AVAILABLE FOR SPEECH-ENABLED PROCESSING

BACKGROUND

Voice activated electronic devices are becoming more prevalent in modern society. In an effort to make voice activated electronic devices more user friendly, the devices are customizable through the activation of specific functionality. Described herein are technical solutions to improve the user experience with such and other machines.

DETAILED DESCRIPTION

Figure 1A:
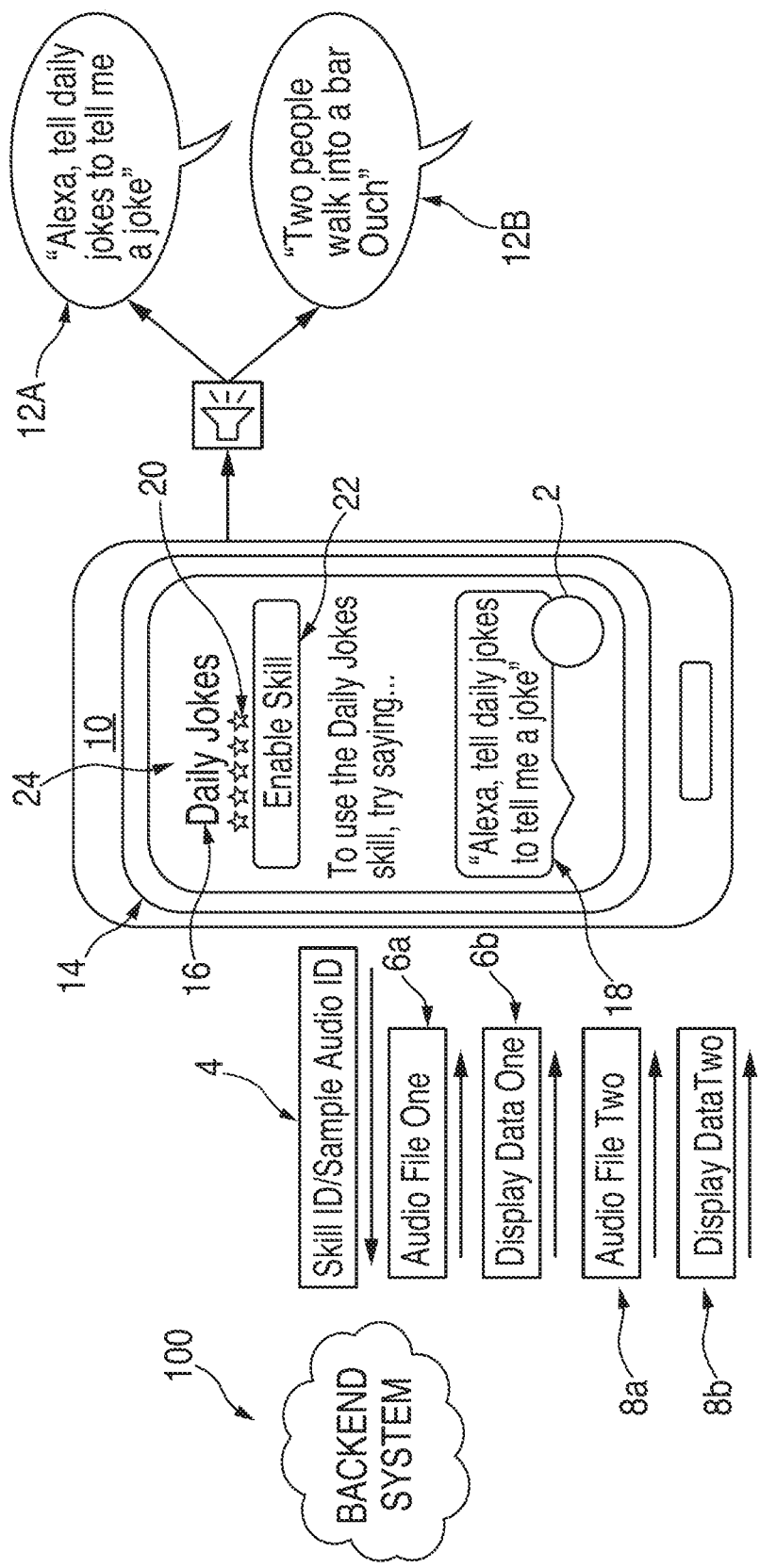
FIGS. 1A, 1B, and 1C, are illustrative diagrams of a system for using a touch input to sample a functionality of a backend system, in accordance with various embodiments.

The present disclosure, as set forth below, is generally directed to various embodiments of methods and devices for previewing various functionalities for an electronic device in response to a touch input. An individual may, in a non-limiting embodiment, touch and hold a preview displayed on a requesting device, which may be in communication with a backend system. The backend system, for instance, may include one or more functionalities, or may be in communication with additional systems including one or more functionalities capable of providing the requesting device content and/or causing particular actions. Such functionalities may need to be enabled for a user account on the backend system prior to being used by the requesting device. In order to determine whether to add a functionality of the backend system to their user account, an individual can preview the functionality before being enabled. In some embodiments, the individual may touch a display of their electronic device, which may have a preview of the functionality displayed thereon. For example, a sample of the functionality may be displayed within a client application on the individual's electronic device, which the individual may press for a predefined amount of time (i.e., long press) in order to preview that functionality.

In some embodiments, a functionality of the backend system (which as used herein includes source code sometimes referred to as "skills") may be previewed in response to touch inputs. For instance, an individual may choose to preview a particular functionality using a local client application for the backend system on their electronic device. The local client application may communicate with a web-based server, in some embodiments. This communication may allow an electronic device to perform various functions associated with the web-based server locally through the client application.

The local client application may include exemplary invocations, as well as replies to those invocations, that provide the individual with examples of how the various functionalities may be used. To sample a skill, an individual may long press (e.g., contact a display screen for longer than a predefined amount of time) on a portion of their electronic device's display that is displaying a sample invocation thereon. After the electronic device detects a particular touch input, such as a long press, on particular location of the device's display screen that is displaying a sample invocation, the electronic device may send a first identifier associated with the functionality of the backend system to the backend system. The first identifier may allow the backend system to determine the particular functionality that the individual is selecting for preview. For instance, the individual may want to try a "Daily Jokes" functionality of the backend system before adding the functionality to their user account. In some embodiments, after receiving the first identifier, the backend system may further receive a second identifier, which may allow the backend system to identify a particular sample invocation/reply that the individual is selecting to be previewed. For instance, the individual may also select a particular example joke displayed within the sample of the "Daily Jokes" functionality displayed by the client application. As an illustrative example, the individual may touch a portion of their device's display screen having a sample invocation, "Alexa, tell daily jokes to tell me a joke," displayed thereon. In some embodiments, the individual may perform a long press on a portion of the display screen that the sample invocation is displayed on.

In some embodiments, after the backend system determined the functionality that has requested to be previewed, the backend system may determine first text data representing the first preview invocation. For example, if "Daily Jokes" was selected, the backend system may determine first text data associated with the "Daily Jokes" functionality. The first text data may represent the first preview invocation, and first audio data may be generated representing the first text data by performing text-to-speech processing on the first text data. Similarly, the backend system may also determine second text data representing a first preview reply (e.g., "Knock, Knock." "Who's there?") to the first preview invocation, and second audio data representing the second text data may also be generated by performing text-to-speech processing on the second text data. In some embodiments, the first audio data may be sent to the electronic device such that the first preview invocation is played by the electronic device. Furthermore, the second audio data may also be sent to the electronic device such that the first preview reply is played after the first preview invocation.

In some embodiments, the backend system may cause the first audio data to be played such that a specific voice type is used. Various voice types may be stored by the backend system. For instance, a first voice type may be used for the first audio data, while a second voice type may be used for the second audio data. As used herein, a voice type may refer to a predefined audio frequency range with which audio data generated, such that the audio data, when output by an electronic device, has that predefined audio frequency range. In some embodiments, the backend system may receive an instructions from the client application indicating which voice type to be used. These instructions may cause textto-speech processing to generate audio data with that specific voice type. Furthermore, one or more accents or pronunciations may be employed for any voice type. For example, one voice type might employ a New York accent, such that, if used, the first preview invocation and/or first preview reply are spoke using a New York accent.

After playing the second audio data, the individual may want to hear more samples of the functionality. The individual, in some embodiments, may continue to contact the display screen (e.g., continuing the long press). This may cause additional audio data representing additional preview invocations and/or replies to be generated and sent to the electronic device to be played. For instance, three preview invocations and three preview replies may be displayed within the client application. If the individual continues to perform a long press on their electronic device, in this particular scenario, then in additional to playing the first and second audio data representing the first preview invocation and the first preview reply, the backend system may generate and send audio data representing the second preview invocation, the second preview reply, the third preview invocation, and/or the third preview reply.

Figure 1B:
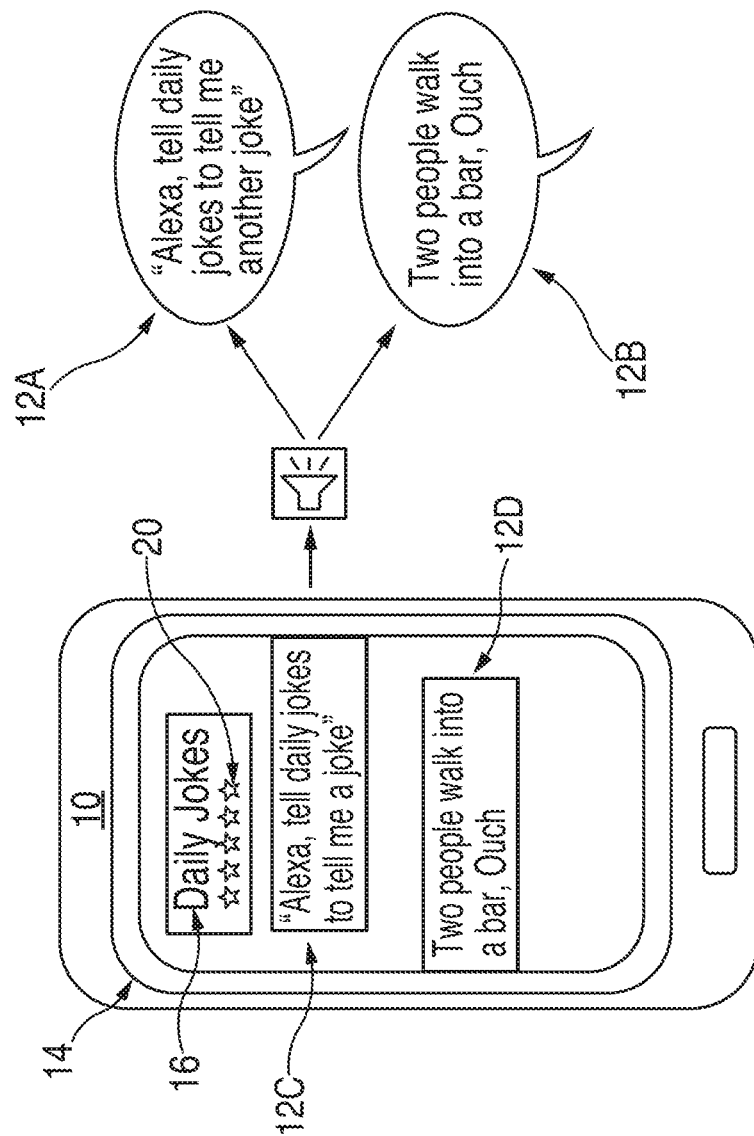
Figure 1C:
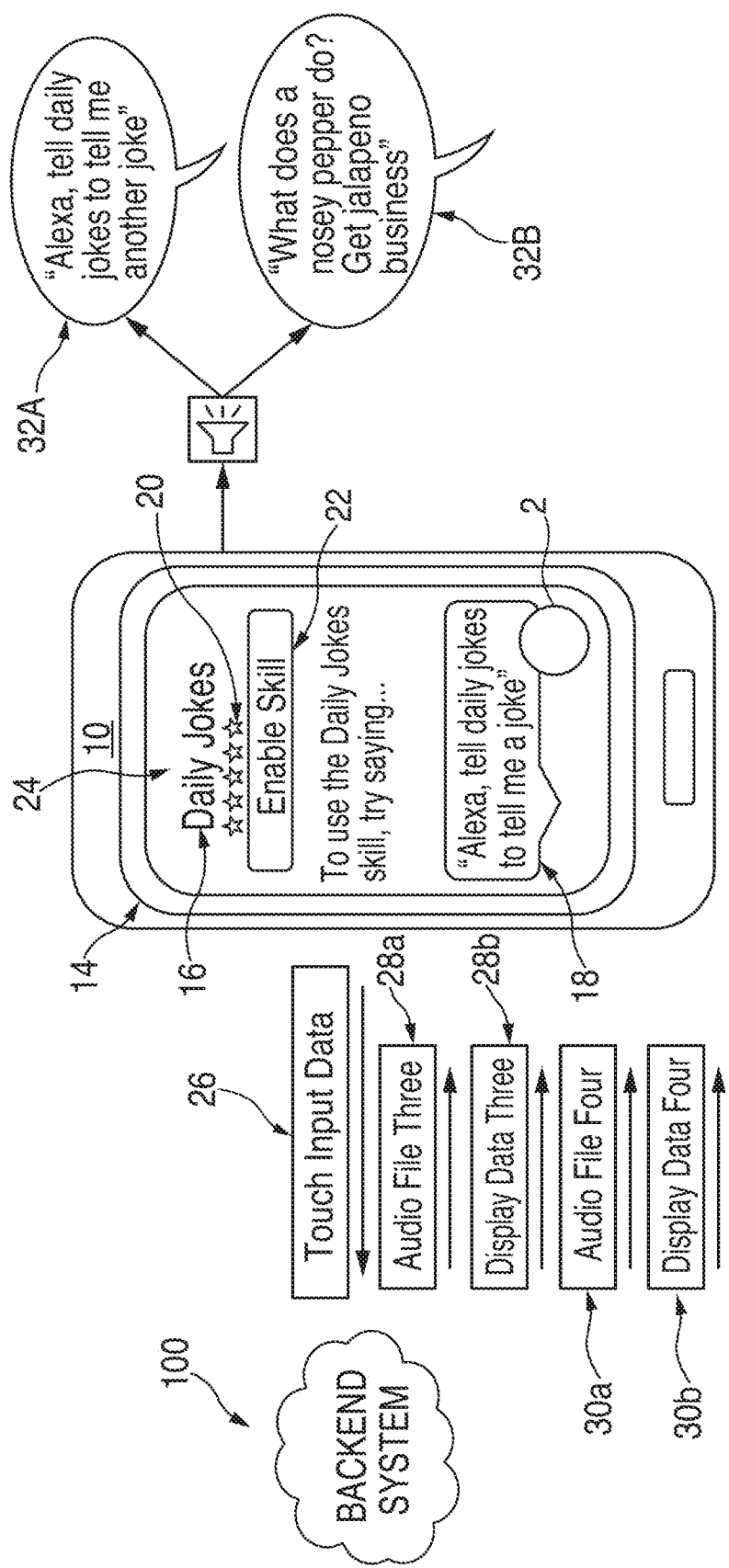

FIGS. 1A, 1B, and 1C are illustrative diagrams of a system for using a touch input to sample a functionality of a backend system, in accordance with various embodiments. Electronic device 10, in some embodiments, may correspond to any electronic device or system. Various types of electronic devices may include, but are not limited to, desktop computers, mobile computers (e.g., laptops, ultra-books), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, electronic device 10 may be relatively simple or basic in structure such that no mechanical input option(s) (e.g., keyboard, mouse, trackpad) or touch input(s) (e.g., touchscreen, buttons) may be provided. In some embodiments, however, electronic device 10 may also correspond to a network of devices. In one exemplary, non-limiting embodiment, an individual may perform a touch input 2 on display screen 14 of electronic device 10 to select statement 18 of skill Daily Jokes 16. For example, touch input 2 may correspond to an individual pressing on display screen 14 for a certain amount of time (e.g., approximately two seconds) using one or more objects (e.g., finger(s), stylus, etc.). A touch input having a temporal duration of approximately two seconds may, in some embodiments, be referred to as a long press. However, a long press may correspond to an input that has any temporal duration. Persons having ordinary skill in the art recognize that the use of a two second temporal duration is merely exemplary. Alternatively, touch input 2 may correspond to any particular type of touch input, such as, and without limitation, a tap, a swipe, a clockwise motion, a counterclockwise motion, or any type of touch input, or any combination thereof.

Alternatively, in some embodiments, electronic device 10 may be voice activated. A user may be able to receive a command in order to select statement 18 of skill 16. A command may include an utterance of a wakeword (e.g. "Alexa" or "Amazon"), followed by a question. A command may correspond to a question regarding the selected skill. For example, a user may say, "Alexa—Sample skill Daily Jokes." However, alternative or additional commands may include, but are not limited to, "Alexa—How do I use skill Daily Jokes?" or "Alexa—How does skill Daily Jokes work?"

Furthermore, in some embodiments, electronic device 10 may correspond to a manually activated electronic device. In this particular scenario, the electronic device may be activated in response to a user input, such as pressing a button, touching a display screen, waving a hand, and the like. After the user input is detected, audio may begin to be captured. In some embodiments, audio may be captured by the manually activated electronic device for a predefined amount of time, such as a few seconds. However, manually activated electronic device may also record audio data until speech is no longer detected by one or more microphones of the manually activated electronic device.

As used herein, the term "wakeword," may also refer to any "keyword" or "key phrase," any "activation word" or "activation words," or any "trigger," "trigger word," or "trigger expression." Persons of ordinary skill in the art will recognize that the aforementioned wakewords, "Alexa" and "Amazon" are merely exemplary, and any word, series of words (e.g., "Hello" or "Good Morning") may be used a wakeword. Furthermore, wakeword may be set or programmed by an individual, and, in some embodiments, electronic device 10 may have more than one wakeword (e.g., two or more different wakewords) that may each activate electronic device 10. Furthermore, the trigger that may be used to activate electronic device 10 may be any series of temporally related sounds.

An individual browsing graphical user interface 24 on display screen 14 of electronic device 10 may want to try out a functionality of backend system 100. For example, an option to preview a functionality of the backend system named "Daily Jokes," which may be capable of providing the individual with a new joke each day, may be displayed so that a preview of this functionality may be provided to the individual. A functionality (which may include computer readable code sometimes referred to as a "skill"), as used herein, may correspond a set of rules, terms, and frameworks capable of being used to update a language model associated with an individual's user account on backend system 100. Such functionalities, when enabled, may cause the language model to be updated such that additional words or phrases are recognizable, and capable being use for responded to. For example, if the Daily Jokes 16 is enabled, word or phrases such as "jokes," "daily jokes," and/or "tell daily jokes to tell me a joke," may be included in an individual's language model such that subsequent utterances including those words and/or phrase, are capable of being responded to using the functionality of Daily Jokes 16. Various types of exemplary functionalities may correspond to the weather, ordering a taxi, ordering a pizza, and/or hearing/telling a joke. Persons of ordinary skill will recognize that the aforementioned are merely exemplary and that functionalities may be included in the individual's language mode, such that he/she may have their user experience customized.

In some embodiment, a user may choose a specific skill because of rating 20. In an exemplary, non-limiting embodiment, rating 20 may refer to how much other users liked the skill. Rating 20, in one embodiment, may be based on a star rating. A star rating may correspond to a system where more stars is associated with a better rating. While a star rating is described herein, persons of ordinary skill in the art would recognize that any kind of rating system or metric may be used.

After a user has selected Daily Jokes 16, such as by performing a touch input 2 on display screen 14 of electronic device 10 at a particular location where Daily Jokes is being displayed, electronic device 10 may send instructions to backend system 100 indicating that a preview invocation and/or reply for particular functionality is to be previewed. An invocation, as used in this particular embodiment, may correspond to a portion of an utterance that is spoken after a trigger, such as a wakeword or manual input. For example, an utterance may include a wakeword, (e.g., "Alexa") that is subsequently followed by an invocation (e.g., "tell 'Daily Jokes' to tell me a joke"). In this example, the name "Daily Jokes" may correspond to a name associated with a particular functionality of backend system 100. In some embodiments, an invocation may not require the name of the functionality to be used. For example, the invocation might simply correspond to "tell me a joke," or "play a joke for me."

Display screen 14 may detect touch input in a variety of ways. For example, touch input 2 may be registered by detecting the change in resistance of current when a point on display screen 14 is touched. This may be accomplished by having two separate layers of display screen 14. Generally, the bottom layer is made of glass and the top layer may be made of a plastic film. When an individual pushes down on the film and the film makes contact with the glass, it completes the circuit. Both the glass and the film may be covered with a grid of electrical conductors. The conductors may be comprised of fine metal wires. They also may be comprised of a thin film of transparent conductor material. In some embodiments, the conductor material may be indium tin oxide (ITO). In some embodiments, electrodes on the two layers run at perpendicular to each other. For example, the conductors on the glass sheet may run in one direction and the conductors on the plastic film may run in a direction 90 degrees from the conductors on the glass sheet. When touch input 2 is detected, an individual may press down on display screen 14. When the film is pressed down on, contact is made between the grid of electrical conductors on the glass screen and the grid of electrical conductors on the plastic film, completing the circuit. When the circuit is completed, the voltage of the circuit is measured. The point on the screen may be measured based on the amount of resistance at the contact point. The voltage may then be converted by analog to digital converters, creating a digital signal that electronic device 10 can use as an input signal from touch input 2.

As another example, electronic device 10 may use projected capacitance. Electronic device 10 may rely on electrical capacitance. Display screen 14 may use two layers of conductors, separated by an insulator. The conductors, for example, may be made of transparent ITO. In some embodiments, conductors on the two layers run at perpendicular to each other. For example, the conductors on the glass sheet may run in one direction and the conductors on the plastic film may run in a direction 90 degrees from the conductors on the glass sheet. When touch input 2 is detected, touch input 2 takes electrical charge from each of the conductive layers at the point of touch input 2. This change in charge can be measured and a location of touch input 2 can be measured. Each conductor may be checked separately, making it possible to identify multiple, simultaneous points of contact on display screen 14. While only two examples of how touch input 2 can be detected by display screen 14 are described, persons of ordinary skill recognize that any suitable technique for detecting a touch input can be used, and the aforementioned are merely exemplary.

Once touch input 2 has been registered by electronic device 10, electronic device 10 may send a request, Skill ID/Sample Audio ID 4, to backend system 100. In this particular example, Skill ID/Sample Audio ID 4 may include a first identifier and second identifier. For example, the first identifier may correspond to a particular functionality while a second identifier may correspond to a particular example invocation and reply employing the functionality. These identifiers may be a string of characters including numbers, letters, or a combination thereof. In some embodiments, the first identifier and the second identifier may be sent separately to backend system 100, however this is merely illustrative, as the first identifier and/or the second identifier may be sent. Upon receipt of the Skill ID/Sample Audio ID 4, backend system 100 can recognize the functionality (e.g., Daily Jokes 16) and sample invocation 18 (e.g., "Alexa, tell daily jokes to tell me a joke.") selected by the user. For example, Daily Jokes 16 may have an identifier of "001A" and sample invocation 18 may have an identifier of "001A-1."

Skill ID/Sample Audio ID 4 may be sent to backend system 100 from electronic device 10, and may include one or more pieces of additional data, such as a time and/or date that touch input 2 was registered, a location of electronic device 10 (e.g., a GPS location), an IP address associated with electronic device 10, a type of device that electronic device 10 is, or any other information, or any combination of information. For example, when touch input 2 is registered, electronic device 10 may obtain a GPS location of device 10 to determine a location of a user as well as a time/date (e.g., hour, minute, second, day, month, year, etc.) when touch input 2 was detected.

Skill ID/Sample Audio ID 4 may be sent over a network, such as the Internet, to backend system 100 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between electronic device 10 and backend system 100. In some embodiments electronic device 10 and backend system 100 may communicate with one another via a web browser using HTTP. Various additional communication protocols may be used to facilitate communications between electronic device 10 and backend system 100 including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Backend system 100 may include one or more servers, each in communication with one another and/or electronic device 10. Each server within backend system 100 may be associated with one or more databases or processors that are capable of storing, retrieving, processing, analyzing, and/or generating data to be provided to electronic device 10. For example, backend system 100 may include one or more sports servers for storing and processing information related to different sports (e.g., baseball, football, hockey, basketball, etc.). As another example, backend system 100 may include one or more traffic servers for storing traffic information and/or traffic weather information to electronic device 10. Backend system 100 may, in some embodiments, correspond to a collection of servers located within a remote facility, and individuals may store data on backend system 100 and/or communicate with backend system 100 using one or more of the aforementioned communications protocols.

Backend system 100 may also include one or more computing devices in communication with the one or more servers of backend system 100, and may include one or more processors, communication circuitry (including any circuitry capable of using any of the aforementioned communications protocols), and/or storage/memory. Backend system 100 may also include various modules that store software, hardware, logic, instructions, and/or commands for backend system 100 to perform, such as, for example, a speech-to-text ("STT") module, a text-to-speech ("TTS") module, a skill module, or other modules. A more detailed description of backend system 100 is provided below.

Once backend system 100 receives Skill ID/Sample Audio ID 4, backend system 100 searches for the corresponding functionality. In one embodiment, Skill ID/Sample Audio ID 4 may not be an audio file, and therefore automated speech recognition processing and/or natural language understanding processing may not be needed. In this embodiment, backend system 100 may determine that the user is attempting to sample a particular functionality corresponding to an invocation. In another embodiment, the data received by backend system 100 can include an identifier flagging the request a sample of a particular functionality and corresponding to an invocation. Furthermore, Skill ID/Sample Audio ID 4 may include data with identifiers for the a particular functionality and/or sample invocation/reply selected by the user, and backend system 100 may search through the various functionalities capable of being used with backend system 100 to determine a which functionality, as well as, a particular sample invocation/reply, to use in response. Continuing the above example, when backend system 100 receives identifiers "001A" and "001A-1," backend system 100 can send the Skill ID/Sample Audio ID 4 a module for determining a particular functionality and/or invocation that have been selected for previewing. After backend system 100 determines the requested functionality and/or invocation, backend system 100 may generate audio data corresponding to the preview invocation and/or the preview reply, and may send the audio data to electronic device 10. Furthermore, in some embodiments, backend system 100 generate display data of a rendering for display 14.

In some embodiments, the backend system receives text data representing statement 18 from a skill within a skills or category server. The skills or category server is described in more detail below in the description of FIG. 2. This text file is converted into an audio file by executing TTS on the text file. The resulting audio file is Audio file one 6a. Audio file one 6a is an audio representation of statement 18. A TSS module within backend system 100 is described in more detail in the description of FIG. 2.

In some embodiments, a skill module within backend system 100 searches for a response to statement 18 of the identified skill Daily Jokes 16. Once the response is identified, a text file representing the response is sent to the backend system. The text file is then converted into an audio file by executing TTS on the text file. The resulting audio file is Audio file two 8a. Audio file two 8a is an audio representation of the response to statement 18. A skill module within backend system 100 is described in more detail in the description of FIG. 2.

In some embodiments, the backend system will also receive display data. The display data may include text representing statement 18. The backend system may receive display data one 6b. Display data one 6b, in some embodiments, may include text that represents sample audio 18 in text form. The backend system may also receive display data two 8b. Display data two 8b may include text that represents a response to sample audio 18. In some embodiments, the display data one 6b may be embedded within audio file one 6a. In some embodiments, display data two 8b may be embedded within audio file two 8a. Furthermore, in some embodiments, both sets of display data may be sent together.

Audio file one 6a is then transmitted to electronic device 10. Once received by electronic device 10, audio file one 6a (an audio representation of statement 18) is played on one or more speakers of electronic device 10. Similar to audio file one 6a, display data one 6b may be sent to electronic device 10. Once received by electronic device 10, electronic device 10 may display text representing statement 18 on display screen 14. Following Audio file one 6a, Audio file two 8a is transmitted to electronic device 10. Audio file two 8a is then played by one or more speakers of electronic device 10. Similar to audio two one 8a, display data two 8b may be sent to electronic device 10. Once received by electronic device 10, electronic device 10 may display text representing a response to statement 18 on display screen 14. Audio file one 6a, display data one 6b, audio file two 8a, and display data two 8b may be transmitted, similarly to Skill ID/Sample Audio ID 4, over a network, such as the Internet, to electronic device 10 using any number of communications protocols. In this embodiment, the user would hear the audio invocation 12A, "Alexa, tell daily jokes to tell me a joke." Then the user would hear the audio response 12B, "Two people walk into a bar, Ouch."

In some embodiments, if an individual likes the sampled skill, the individual may want to enable the sampled skill. To enable the sampled skill an individual may select Enable Skill 22 on graphical user interface 24. As an example, an individual, having a user account on backend system 100, may have the skill entitled "Daily Jokes" enabled. In some embodiments, enabling the skill may include providing the backend system, more particularly the Natural Language Understanding (NLU) module 260 with one or more additional rules. The rules that are included with NLU module 260 for the skill may cause certain invocations, if detected by NLU module 260, to be serviced using that skill. For example, if the skill that is enabled is the "Daily Jokes" skill, then invocations that are related to, or directed towards, the cat facts skill may cause the "Daily Jokes" skill to perform one or more actions, such as providing response information to the invocation. As an illustrative example, if the skill to be enabled is "Daily Jokes," then NLU module 260, for the particular user account with which the enablement request was associated, may be provided with a rule that for invocations of the form, "Alexa—tell daily jokes to tell me a joke," NLU module 260 is to call the "Daily Jokes" skill to obtain information. The backend system and NLU are described in more detail below in the description of FIG. 2.

FIG. 1B is a representation of electronic device 10 having a display screen 14 that may display a first text invocation 12C. Once display data one 6b is received by electronic device 10, first text invocation 12C may be displayed on display screen 14 of electronic device 10. Similar to display data one 6b, display data two 8b may also cause electronic device 10 to display first text response 12D on display screen 14. The display may happen before, simultaneously with, or after audio invocation 12A and audio response 12B. In some embodiments, the display of electronic device 10 may be altered such that graphical user interface 14 is out of focus behind first text invocation 12C and first text response 12D. In some embodiments, the first text invocation 12C and first text response 12D may be the only items displayed on display screen 14. In some embodiments, Daily Jokes 16 may be redisplayed at the top of display screen 14.

If an individual wanted to continue to sample the selected skill, the individual may continue touch input 2. FIG. 1C, shows an individual continuing touch input 2 after audio response 12B was played by electronic device 10. After continuing touch input 2, electronic device 10 may send Touch Input Data 26 to backend system 100. Touch Input Data 2, in some embodiments, may be an indicator that lets the backend system know that touch input 2 is continuing. Touch Input Data 26 may be sent (e.g. transmitted) over a network, such as the Internet, to backend system 100 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between electronic device 10 and backend system 100. In some embodiments electronic device 10 and backend system 100 may communicate with one another via a web browser using HTTP. Various additional communication protocols may be used to facilitate communications between electronic device 10 and backend system 100 including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

After receiving Touch Input Data 26, the backend system may search for more samples within Daily Jokes 16. This process is explained in more detail in the description of FIG. 4B. Once the backend system determines that additional samples are available, in some embodiments, the backend system receives text data representing a second statement from a skill within a skills or category server. The skills or category server is described in more detail below in the description of FIG. 2. In one embodiment, the second statement may be "Alexa, tell daily jokes to tell me another joke." This text file is converted into an audio file by executing TTS on the text file. The resulting audio file is audio file three 28a. Audio file three 28a is an audio representation of the second statement. A TSS module within backend system 100 is described in more detail in the description of FIG. 2.

In some embodiments, the backend system will also receive display data. The display data may include text representing the second statement. The backend system may receive display data three 28b. Display data three 28b, in some embodiments, may include text that represents the second statement in text form. The backend system may also receive display data four 30b. Display data four 30b may include text that represents a response to the second sample audio. In some embodiments, the display data three 28b may be embedded within audio file three 28a. In some embodiments, display data four 30b may be embedded within audio file four 30a. Furthermore, in some embodiments, both sets of display data may be sent together.

In some embodiments, a skill module within backend system 100 searches for a response to the second statement of the identified skill Daily Jokes 16. In some embodiments, this response may be "What does a nosey pepper do? Get jalapeno business." Once the response is identified, a text file representing the response is sent to the backend system. The text file is then converted into an audio file by executing TTS on the text file. The resulting audio file is audio file four 30a. Audio file four 30a is an audio representation of the response to the second statement. A skill module within backend system 100 is described in more detail in the description of FIG. 2.

Audio file three 28a is then transmitted to electronic device 10. Once received by electronic device 10, audio file three 28a is played on one or more speakers of electronic device 10. Similar to audio file three 28a, display data three 28b may be sent to electronic device 10. Once received by electronic device 10, electronic device 10 may display text representing the second statement on display screen 14. Following audio file three 28a, audio file four 30a is transmitted to electronic device 10. Audio file four 30a is then played by one or more speakers of electronic device 10. Similar to audio two four 30a, display data four 30b may be sent to electronic device 10. Once received by electronic device 10, electronic device 10 may display text representing a response to the second statement on display screen 14. In this embodiment, the user would hear the audio invocation 32A, "Alexa, tell daily jokes to tell me another joke." Then the user would hear the audio response 32B, "What does a nosey pepper do? Get jalapeno business."

In some embodiments, touch input 2 may continue past the playing of Audio file four 30a. If this happens, the backend system may continue to transmit audio files sampling the selected skill. This may continue until there are no examples left. In some embodiments, after the backend system has run out of examples, the backend system may start over and transmit Audio file one 6a.

FIG. 1C is a representation of display data three 28b and display data four 30b being received and displayed by electronic device 10. Once display data three 6b is received by electronic device 10, second text invocation 32C may be displayed on display screen 14 of electronic device 10. Similar to display data three 28b, display data four 30b may also cause electronic device 10 to display second text response 32D on display screen 14. The display may happen before, simultaneously with, or after audio invocation 32A and audio response 32B. In some embodiments, second text invocation 32C may be displayed below first text response 12D. The continued display may be in response to the continued touch input. In some embodiments, the display of electronic device 10 may be altered such that graphical user interface 14 is out of focus behind second text invocation 32C and second text response 32D. In some embodiments, the second text invocation 32C and second text response 32D may be the only items displayed on display screen 14. In some embodiments, Daily Jokes 16 may be redisplayed at the top of display screen 14.

Figure 2:
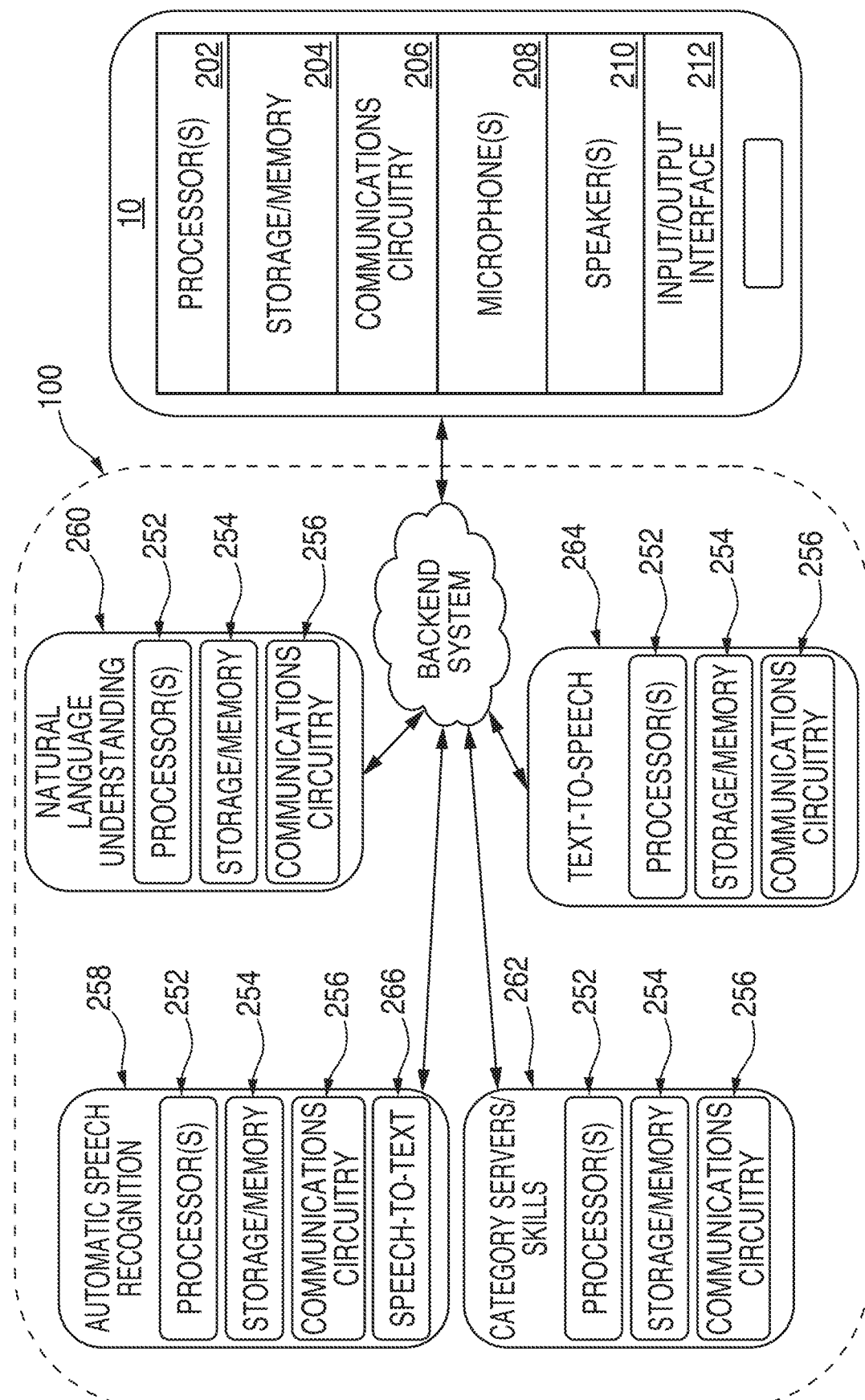
FIG. 2 is an illustrative diagram of the architecture of the system of FIG. 1A in accordance with various embodiments.

FIG. 2 is an illustrative diagram of the architecture of the system of FIG. 1 in accordance with various embodiments. Electronic device 10, in some embodiments, may correspond to any type of electronic device capable of receiving a touch input. Electronic device 10 may, in some embodiments, be also capable of recognizing and receiving voice commands after detecting the specific sound (e.g., a wakeword or trigger), recognize commands (e.g., audio commands, inputs) within captured audio, and may perform one or more actions in response to the received commands. Various types of electronic devices may include, but are not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, however, electronic device 10 may also correspond to a network of devices.

Electronic device 10 may include one or more processors 202, storage/memory 204, communications circuitry 206, one or more microphones 208 or other audio input devices (e.g., transducers), one or more speakers 210 or other audio output devices, as well as an optional input/output ("I/O") interface 212. However, one or more additional components may be included within electronic device 10, and/or one or more components may be omitted. For example, electronic device 10 may include a power supply or a bus connector. As another example, electronic device 10 may not include an I/O interface. Furthermore, while multiple instances of one or more components may be included within electronic device 10, for simplicity only one of each component has been shown.

Processor(s) 202 may include any suitable processing circuitry capable of controlling operations and functionality of electronic device 10, as well as facilitating communications between various components within electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), skill specific integrated circuits ("ASICs"), skill-specific standard products ("AS SPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more skills (e.g., gaming, music, video, calendars, lists, etc.) may be run by processor(s) 202, and may be stored in memory 204.

In some embodiments, storage/memory 204 may include one or more modules and/or databases, such as speech recognition module 214, list of wakewords database 216, wakeword detection module 218, and adaptive echo cancellation module 220. Speech recognition module 214 may, for example, include an automatic speech recognition ("ASR") component that recognizes human speech in detected audio. Speech recognition module 214 may also include a natural language understanding ("NLU") component that determines user intent based on the detected audio. Also included within speech recognition module 214 may be a text-to-speech ("TTS") component capable of converting text to speech to be outputted by speaker(s) 210, and/or a speech-to-text ("STT") component capable of converting received audio signals into text to be sent to backend system 100 for processing.

List of wakewords database 216 may be a database stored locally on electronic device 10 that includes a list of a current wakeword for electronic device 10, as well as one or more previously used, or alternative, wakewords for voice activated electronic device. In some embodiments, an individual may set or program a wakeword for electronic device 10. The wakeword may be programmed directly on electronic device 10, or a wakeword or words may be set by the individual via a backend system skill that is in communication with backend system 100. For example, an individual may use their mobile device having the backend system skill running thereon to set the wakeword. The specific wakeword may then be communicated from the mobile device to backend system 100, which in turn may send/notify electronic device 10 of the individual's selection for the wakeword. The selected activation may then be stored in database 216 of storage/memory 204.

Wakeword detection module 218 may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An MINI model represents a word as a series of states. Generally a portion of an audio signal is analyzed by comparing its MINI model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 10 may then begin transmitting the audio signal to backend system 100 for detecting and responds to subsequent utterances made by an individual.

Adaptive echo cancellation module 220 may include one or more adaptive echo cancellation filters that filter acoustic echo audio signals from received audio signals. The adaptive echo cancellation filters may automatically adapt based on the acoustic environment in and around electronic device 10 based on audio received by electronic device 10. In some embodiments, adaptive echo cancellation module 220 may be configured to enable and disable adaptive echo cancellation for selected time periods. During time periods when adaptation is disabled, adaptive echo cancellation module 200 will may not update the adaptive echo cancellation filtered based on any audio signals received by electronic device 10, however adaptive echo cancellation module 220 may continue to filter acoustic echo signals from the incoming audio data.

Communications circuitry 206 may include any circuitry allowing or enabling electronic device 10 to communicate with one or more devices, servers, and/or systems. For example, communications circuitry 206 may facilitate communications between electronic device 10 and backend system 100. Communications circuitry 206 may use any communications protocol, such as any of the previously mentioned exemplary communications protocols. In some embodiments, electronic device 10 may include an antenna to facilitate wireless communications with a network using various wireless technologies (e.g., Wi-Fi, Bluetooth®, radiofrequency, etc.). In yet another embodiment, electronic device 10 may include one or more universal serial bus ("USB") ports, one or more Ethernet or broadband ports, and/or any other type of hardwire access port so that communications circuitry 206 allows electronic device 10 to communicate with one or more communications networks.

Electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 10 may include multiple microphones (e.g., four, seven, ten, etc.) placed at various positions about electronic device 10 to monitor/capture any audio outputted in the environment where electronic device 10 is located. The various microphones 208 may include some microphones optimized for distant sounds, while some microphones may be optimized for sounds occurring within a close range of electronic device 10.

Electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where electronic device 10 may be located. In some embodiments, speaker(s) 210 may include headphones or ear buds, which may be wirelessly connected, or hard-wired, to electronic device 10, that may be capable of broadcasting audio directly to an individual.

In some embodiments, electronic device 10 may be hardwired, or wirelessly connected, to one or more speakers 210. For example, electronic device 10 may cause one or more speakers 210 to output audio thereon. In this particular scenario, electronic device 10 may receive audio to be output by speakers 210, and electronic device 10 may send the audio to speakers 210 using one or more communications protocols. For instance, electronic device 10 and speaker(s) 210 may communicate with one another using a Bluetooth® connection, or another near-field communications protocol. In some embodiments, electronic device 10 may communicate with speaker(s) 210 indirectly. For example, electronic device 10 may communicate with backend system 100, and backend system 100 may communicate with speaker(s) 210. In this particular example, electronic device 10 may send audio data representing a command to play audio using speaker(s) 210 to backend system 100, and backend system 100 may send the audio to speaker(s) 210 such that speaker(s) 210 may play the audio thereon.

In some embodiments, one or more microphones 208 may serve as input devices to receive audio inputs, such as speech from an individual. Electronic device 10, in the previously mentioned embodiment, may then also include one or more speakers 210 to output audible responses. In this manner, electronic device 10 may function solely through speech or audio, without the use or need for any input mechanisms or displays.

In one exemplary embodiment, electronic device 10 includes I/O interface 212. The input portion of I/O interface 212 may correspond to any suitable mechanism for receiving inputs from a user of electronic device 10. In some embodiments, I/O interface 212 may include a display screen and/or touch screen, which may be any size and/or shape and may be located at any portion of electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon. Additionally, for example, a camera, keyboard, mouse, joystick, or external controller may be used as an input mechanism for I/O interface 212. The output portion of I/O interface 212 may correspond to any suitable mechanism for generating outputs from electronic device 10. For example, one or more displays may be used as an output mechanism for I/O interface 212. As another example, one or more lights, light emitting diodes ("LEDs"), or other visual indicator(s) may be used to output signals via I/O interface 212 of electronic device 10. In some embodiments, one or more vibrating mechanisms or other haptic features may be included with I/O interface 212 to provide a haptic response to touch input 2 from electronic device 10.

Backend system 100, as mentioned previously, may, in some embodiments, be in communication with electronic device 10. Backend system 100 includes various components and modules including, but not limited to, automatic speech recognition ("ASR") module 266, natural language understanding ("NLU") module 260, skills module 262, and text-to-speech ("TTS") module 264. A speech-to-text ("STT") module may be included in the ASR module 266. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for cloud-based information system 100, such as, a speaker identification ("ID") module, a user profile module, or any other module, or any combination thereof.

ASR module 266 may be configured such that it recognizes human speech in detected audio, such as audio captured by electronic device 10. ASR module 266 may also be configured to determine an end time of speech included within the received audio data, such as an end time of question 16. ASR module 266 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions of the latter may apply. NLU module 260 may be configured such that it determines user intent based on the detected audio received from electronic device 10. NLU module 260 may include processor(s) 252, storage/memory 254, and communications circuitry 256. In some embodiments, ASR module 266 may include a speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND® speech processing technologies available from the Autonomy Corporation, which is headquartered in Cambridge, England, United Kingdom.

Skills module 262 may, for example, correspond to various action specific skills or servers capable of processing various task specific actions. Skills module 262 may further correspond to first party skills and/or third party skills operable to perform different tasks or actions. For example, based on the context of audio received from electronic device 10, backend system 100 may use a certain skill to retrieve or generate a response, which in turn may be communicated back to electronic device 10. Skills module 262 may include processor(s) 252, storage/memory 254, and communications circuitry 256. As an illustrative example, skills 262 may correspond to one or more game servers for storing and processing information related to different game (e.g., "Simon Says," karaoke, etc.). As another example, skills 262 may include one or more weather servers for storing weather information and/or providing weather information to electronic device 10.

TTS module 264 may employ various text-to-speech techniques. Techniques for transcribing speech into text are well known in the art and need not be described in further detail herein, any suitable computer implemented speech to text technique may be used to convert the received audio signal(s) into text, such as SOFTSOUND® speech processing technologies available from the Autonomy Corporation, which is headquartered in Cambridge, England, United Kingdom. TTS module 264 may also include processor(s) 252, storage/memory 254, and communications circuitry 256.

Persons of ordinary skill in the art will recognize that although each of ASR module 258, NLU module 260, skills module 262, and TTS module 264 include instances of processor(s) 252, storage/memory 254, and communications circuitry 256, those instances of processor(s) 252, storage/memory 254, and communications circuitry 256 within each of ASR module 258, NLU module 260, skills module 262, and TTS module 264 may differ. For example, the structure, function, and style of processor(s) 252 within ASR module 258 may be substantially similar to the structure, function, and style of processor(s) 252 within NLU module 260, however the actual processor(s) 252 need not be the same entity.

Figure 3A:
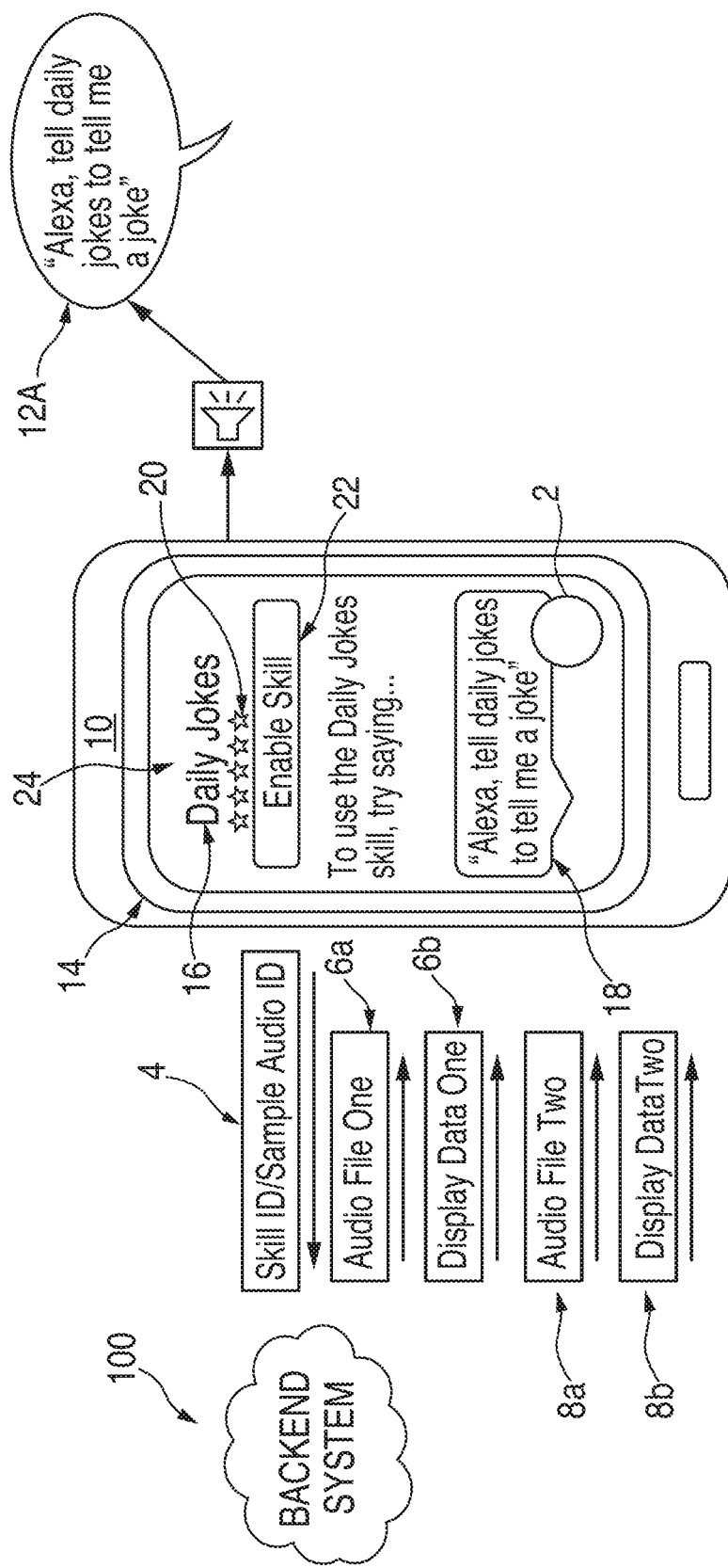
FIGS. 3A and 3B are illustrative diagrams of a system for stopping a sample of a functionality of a backend system in accordance with various embodiments.
Figure 3B:
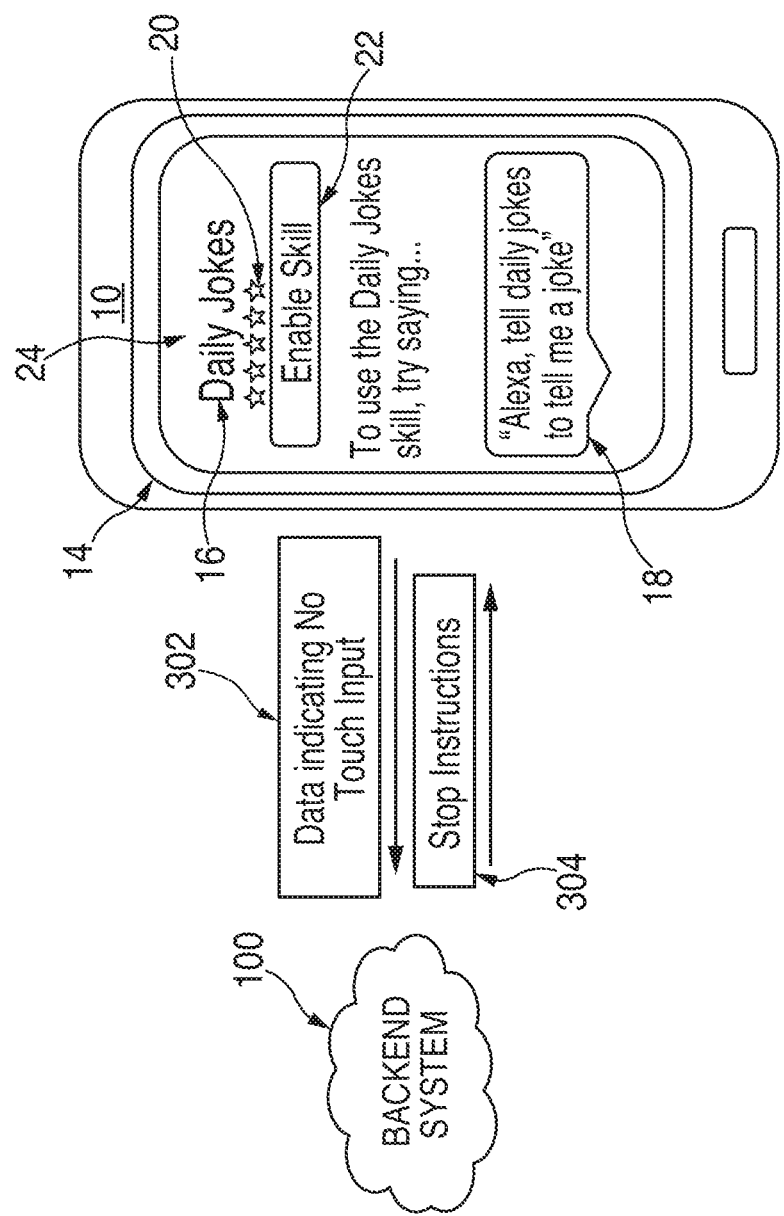

FIGS. 3A and 3B are illustrative diagrams of a system for stopping a sample of a functionality of a backend system in accordance with various embodiments. FIGS. 3A and 3B may be similar to FIGS. 1A and 1B and the same descriptions apply. In one some embodiments, an individual may make a touch input 2 on display screen 14 of electronic device 10 to select statement 18 of skill Daily Jokes 16. In one exemplary embodiment, touch input 2 is pressing on display screen 14 for a temporal duration of approximately two seconds.

Once Daily Jokes 16 has been selected, a user can sample Daily Jokes 16 by making a touch input 2 on display screen 14 of electronic device 10 to select statement 18. An invocation, as used in this particular embodiment, refers to a command that is for the purpose of calling a skill. In this example, as in FIGS. 1A and 1B, the command includes the name of the skill (e.g., "Daily Jokes"). In some embodiments, an invocation may not require the name of the skill being called. For example, the invocation might simply state "Alexa, tell me a joke," or "Alexa, play a joke for me."

Once touch input 2 has been registered on electronic device 10, electronic device 10 sends a request, Skill ID/Sample Audio ID 4, to backend system 100. In this particular example, Skill ID/Sample Audio ID 4 sent to backend system 100 includes a skill identification number and a sample audio identification number. After receiving Skill ID/Sample Audio ID 4, backend system 100 can recognize the skill (e.g., Daily Jokes 16) and statement 18 (e.g., "Alexa, tell daily jokes to tell me a joke.") selected by the user.

Once backend system 100 receives Skill ID/Sample Audio ID 4, backend system 100 searches for the corresponding skill and invocation. Once backend system 100 finds the requested skill and invocation, and recognizes the request is for a sample, backend system 100 prepares two files that are to be sent to electronic device 10. Because the backend system recognizes the Skill ID/Sample Audio ID 4, the backend system may also recognize that electronic device 10 is requesting that both statement 18 and a response to statement 18 be played by electronic device 10. The backend system may receive a first text file from a category or skills module. In this embodiment, the first file is a text file representing statement 18 selected by touch input 2 on display screen 14 of user device 10. The text file representing statement 18 may be received from a Daily Jokes category server.

In some embodiments, the backend system receives text data representing statement 18 from a skills or category server. The skills or category server is described in more detail below in the description of FIG. 2. This text file is converted into an audio file by executing TTS on the text file. The resulting audio file is audio file one 6a. Audio file one 6a is an audio representation of statement 18. A TSS module within backend system 100 is described in more detail in the description of FIG. 2.

In some embodiments, the backend system will also receive display data. The display data may include text representing statement 18. The backend system may receive display data one 6b. Display data one 6b, in some embodiments, may include text that represents sample audio 18 in text form. The backend system may also receive display data two 8*b*. Display data two 8*b* may include text that represents a response to sample audio 18. In some embodiments, the display data one 6*b* may be embedded within audio file one 6*a*. In some embodiments, display data two 8*b* may be embedded within audio file two 8*a*. Furthermore, in some embodiments, both sets of display data may be sent together.

In some embodiments, a skill module within backend system 100 searches for a response to statement 18 of the identified skill Daily Jokes 16. Once the response is identified, a text file representing the response is sent to the backend system. The text file is then converted into an audio file by executing TTS on the text file. The resulting audio file is Audio file two 8*a*. Audio file two 8*a* is an audio representation of the response to statement 18. A skill module within backend system 100 is described in more detail in the description of FIG. 2. Audio file one 6*a* is then transmitted to electronic device 10. Once received by electronic device 10, Audio file one 6*a* (an audio representation of statement 18) is played on one or more speakers of electronic device 10. In this embodiment, the user would hear the audio invocation 12A, "Alexa, tell daily jokes to tell me a joke."

While hearing, or after hearing, audio invocation 12A, an individual may want to stop the sample. In FIG. 3B, touch input 2 on electronic device 10 stops. In some embodiments, once touch input 2 stops, electronic device 10 may transmit Data Indicating No Touch Input 302 to backend system 100. Backend system 100 may determine that the lack of touch input 2 should result in the audio stopping. Backend system 100 may generate stop instructions 304. In some embodiments, stop instructions 304 may cause electronic device 10 to stop playing audio data it received from backend system 100. Furthermore, stopping instructions may cause electronic device 10 to stop all audio output on electronic device 10.

Stop instructions 304 may then be transmitted to electronic device 10. In some embodiments, this will cause electronic device 10 to stop playing audio invocation 12A. In some embodiments, if audio response 12B has been transmitted to electronic device 10, stopping instructions 304 may cause electronic device 10 to stop playing audio response 12B.

Figure 4A:
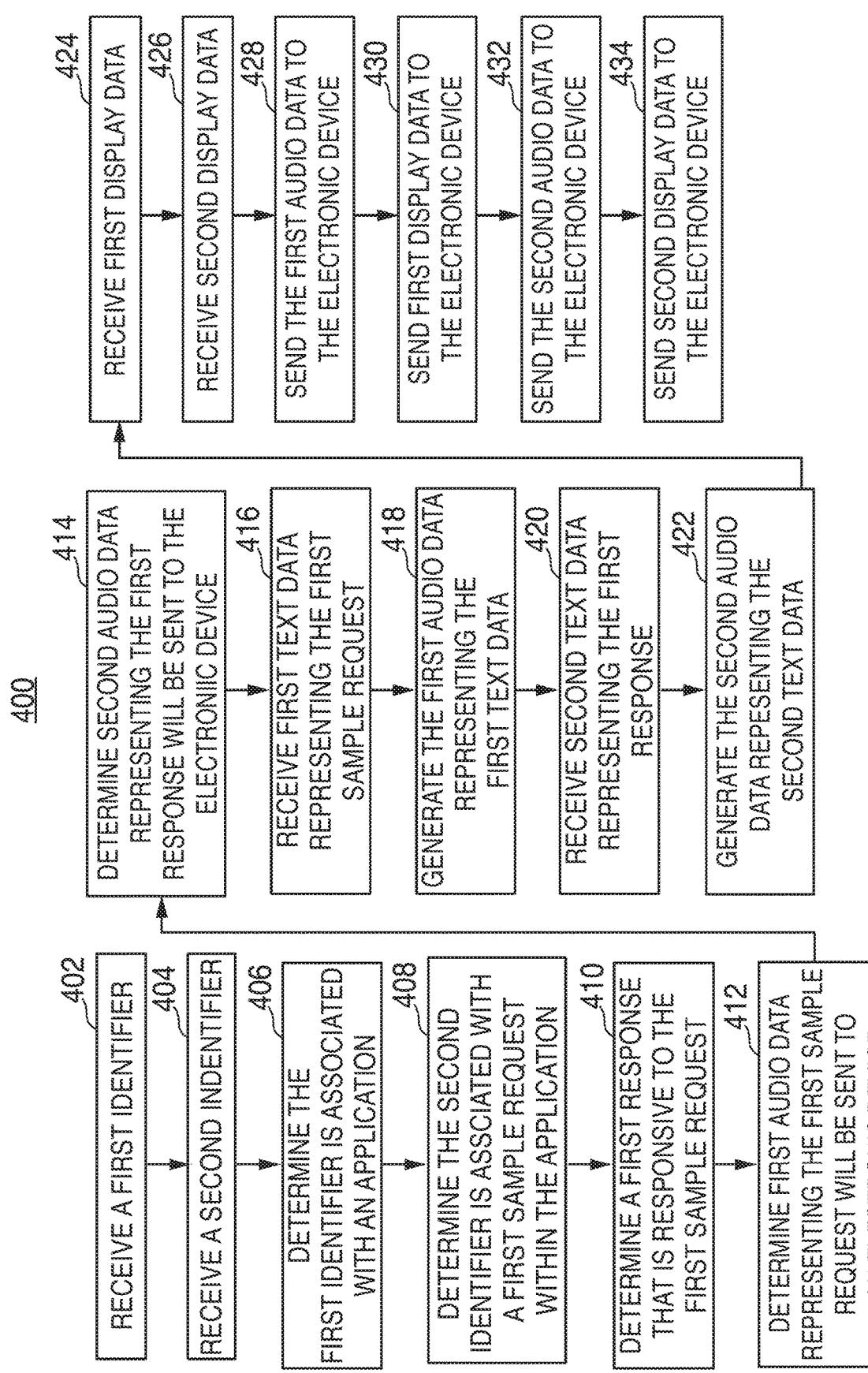
FIG. 4A is an illustrative flowchart of a process for using a touch input to sample a functionality of a backend system in accordance with various embodiments.

FIG. 4A is an illustrative flowchart of a process for using a touch input to sample a functionality of a backend system in accordance with various embodiments. Application, as used in process 400, refer to a functionality of the backend system. Persons of ordinary skill will recognize that steps within process 400 may be omitted or arranged in a different order. Process 400, in some embodiments, may begin at step 402. At step 402, the backend system receives a first identifier. The backend system of process 400 may be similar to backend system 100 and the same description applies. The first identifier sent from an electronic device to the backend system in step 402 may indicate a skill or application that an individual has selected. As used herein, skill or application may be similar to Daily Jokes 16 and the same description applies. For example, an individual may want to sample a news application entitled "News." News, as used herein, is merely exemplary and persons having ordinary skill would recognize that any number of skills may be used. The first identifier, in some embodiments, may include a skill identification number. The first identifier might be a string of characters including numbers, letters or a combination thereof. In some embodiments, the skill identification number. For example, the first identifier for the application News may be "001A." The first identifier may be similar to Skill ID/Sample Audio ID 4 and the same description applies. The electronic device may be similar to electronic device 10 and the same description applies.

In some embodiments, the backend system determines the first identifier was sent in response to a touch input. The backend system can receive many types of data, including, but not limited to, audio data, text data, identifiers, time and/or date data, a location of electronic device 10 (e.g., a GPS location), an IP address associated with electronic device 10, a type of device that electronic device 10 is, or any other information, or any combination of information. In some embodiments, if the backend system receives an identifier indicating a selected skill, the backend system may recognize that the identifier was sent in response to a touch input. The touch input of step 404 may be similar to touch input 2 and the same description applies.

In some embodiments, the first identifier may be in response to a sample request from a computer, laptop or desktop. In these embodiments, a sample request may come in response to a double click or any other predefined manner of requesting for a sample. Persons of ordinary skill in the art recognize that any method of requesting a preview of a function may be suitable.

At step 404, the backend system receives a second identifier. The second identifier may indicate a sample audio request. Continuing the News application example, the sample selected by the user may have a specific statement. For example, the sample may be "Alexa, tell News to tell me what is going on today." The statement may be similar to statement 18 and the same description applies. The second identifier may, in some embodiments, contain a sample audio identification number. This identifier may be a string of characters including numbers, letters or a combination thereof. For example, "Alexa tell News to tell me what is going on today," may have an identifier "001A-1." The second identifier may be similar to Skill ID/Sample Audio ID 4 and the same description applies. Step 404 may be omitted in some embodiments.

At step 406, the backend system determines the first identifier is associated with an application. After receiving the first identifier, the backend system may then try to match the identifier to a specific application. The backend system may use a skills server to determine which skill was selected. The skills server used herein may be similar to Category Servers/Skills 262 and the same description applies. The skills server may have a list of skills, each skill within the list having a predetermined identifier. The backend system would then compare each skill identifier to a list of predetermined skills. In some embodiments, the backend system may receive identifiers that might match the first identifier from a variety of skills within a skills server. Once a match is found, the backend system determines a skill associated with the first identifier. For example, the backend system may receive an identifier from a Joke application server. The Joke application may have an identifier of "002A." The backend system may receive an identifier from a Traffic application server. The Traffic application may have an identifier of "001B." The backend system may receive an identifier from the News application server. The News application might have an identifier of "001A." If the News application was selected and the identifier received was "001A," the backend system may determine that the application selected was the News application.

If there are no matches found, the backend system may receive text data representing an apology message stating "Sorry, no message was found." This text may be transmitted to the electronic device where the text may pop up on a display screen of the electronic device. The display screen may be similar to display screen 14, and the same description applies. In some embodiments, the apology message may be converted into audio data representing the apology message by executing TTS on the text data. This audio data may be sent to the electronic device such that the apology message is played by one or more speakers of the electronic device. The one or more speakers, as described herein, may be similar to speaker(s) 210 and the same description applies.

At step 408, the backend system determines the second identifier is associated with a first sample request within the application. Once a skill or application has been matched to the first identifier, the backend system may then search for a statement within the matched skill or application. In some embodiments, the backend system may receive identifiers that might match the second identifier from a variety of sample audios within the matched skill server. Once a match is found, the backend system determines a sample request within the application associated with the second identifier. For example, in some embodiments, there may be three samples stored within the News application. The backend system may receive a first sample identifier. The first sample may be "Alexa, tell News to tell me what is going on today." The first sample may have an identifier of "001A-1." The second sample may be "Alexa, ask News what is the news today." The second sample may have an identifier of "001A-2." The third sample may be "Alexa, ask News what went on yesterday." The third sample may have an identifier of "001A-3." If the second identifier is "001A-1," the backend system might determine the match is the first sample. Persons of ordinary skill recognize that while only three sample requests are described, any number of sample requests may be stored. Step 408 may be omitted in some embodiments.

At step 410, the backend system determines a first response that is responsive to the first sample request. After determining the first sample request, the backend system may then find a response to the sample request. This response may be an actual response. An actual response, as used herein, may refer to how the skill or application being sample would actually respond to a request. For example, if an individual was sampling a "What is today" application on Jun. 6, 2016, the actual response to a sample request might be "Today is Monday, Jun. 6, 2016." The backend system may determine this response by receiving the response from the category server. In some embodiments, the backend system may determine the correct response by receiving a plurality of responses and determining which of the plurality of responses is correct. In some embodiments, the NLU might receive confidence scores from the skill server representing responses to the sample audio. A confidence score is a representation of how sure a skill is that their response is correct. The NLU may sift through the confidence scores and choose the highest one. In some embodiments, the skill server may only send one response with a high confidence score, indicating that the skill server knows the response. The NLU, as described herein, may be similar to NLU 260 and the same description applies. For example, the News application server may send a response "Alexa, ask News what is the news today," the News application server may send a confidence score representing the response stating "The mayor spoke today." In some embodiments, the response to the sample request may be stored with the sample request. Step 410 may be omitted in some embodiments. In some embodiments, text data representing the response to the first sample request may be stored in the backend system in text form. In some embodiments, audio data representing the response may be stored locally.

At step 412, the backend system determines first audio data representing the first sample request will be sent to an electronic device. Generally speaking, the backend system may receive audio data, determine a response, and send the responsive audio data. In process 400, the backend system receives an identifier, indicating that a sample has been selected. Because a sample has been selected, the backend system may determine that the audio generally causing the backend system to find a response, will be played by the electronic device. This may allow an individual to learn and experience how a specific skill or application works. For example, the backend system may determine that the sample audio "Alexa, tell News to tell me what is going on today," will be output by the electronic device. Step 412 may be omitted in some embodiments.

In some embodiments, the backend system may determine that the statement will be sent to a second electronic device. The second electronic device, may be, but is not limited to, a voice activated electronic device. In order to determine that audio files should be sent to the second electronic device, the backend system may need to receive a customer identification number associated with the electronic device. The backend system may then find a user account associated with the customer identification number. Once the user account is located, the backend system may search for electronic devices associated with the electronic device. The backend system may find the second electronic device is associated with the electronic device. In some embodiments, the backend system may determine that the second electronic device may receive the statement.

At step 414, the backend system determines second audio data representing the first response will be sent to the electronic device. After determining the first audio data representing the first sample request will be sent to an electronic device, the backend system may determine that the response will also be sent to the electronic device. This would allow an individual sampling an application to hear the sample request and a response to that sample request. For example, the backend system may determine that "The mayor spoke today," will be sent and output by the electronic device after the electronic device outputs, "Alexa, tell News to tell me what is going on today." In some embodiments, as with step 412, the backend system may determine that the response might be sent to a second electronic device. Furthermore, in some embodiments, the backend system may determine that the sample request may be sent to the electronic device and the response may be sent to the second electronic device. Step 414 may be omitted in some embodiments.

At step 416, the backend system receives first text data representing the first sample request. In some embodiments, the text data received by the backend system will come from an application within category server or skills server. The category server or skills server may be the same as, or within Category Servers/Skills 262 of FIG. 2 and the same description applies. In some embodiments, the first text data may represent the sample request. For example, the backend system may receive first text data from the News application server. The first text data may represent the sample audio "Alexa, tell News to tell me what is going on today."

In some embodiments, the backend system may also receive instructions from the skill server. The instructions may indicate that the sample audio is to be played in a specific voice type. In some embodiments, voice types may differ in frequency spectrums. For example, one voice type may be in a frequency spectrum ranging from 1000 Hz to 2000 Hz. A second voice type may be in a frequency spectrum ranging from 2100 Hz to 2800 Hz. While only two different frequency spectrum ranges are given, persons having ordinary skill in the art will recognize that any frequency range may be used and only two were used for exemplary purposes. Additionally, in some embodiments, voice types may have different tones. In some embodiments, voice types may have different tones and frequency spectrums. In a non-limiting, exemplary embodiment, to enhance the experience of a sample, it may be preferable to play the sample audio request in one voice and the response in another voice. In this embodiment, the skill server may send along instructions that indicate the sample audio is to be output using a certain voice.

At step 418, the backend system generates first audio data representing the first text data. Once the first text data has been received from a category server or a skills server, the first text data may be converted into audio data. The data is converted into audio data by executing TTS functionality on the first text data. The TTS functionality may be similar to Text-To-Speech 264 of FIG. 2, and the same description applies. Continuing the News application example, if the text data received by the News application server represents the sample audio, the audio data may represent the following statement, "Alexa, tell News to tell me what is going on today." In some embodiments, if the backend system has received instructions indicating that the sample audio is to be output using a specific voice type, the text data may be converted into audio data representing a statement in the specific voice type. For example, the audio data representing "Alexa, tell News to tell me what is going on today," might be cued to play in a New York accent.

At step 420, the backend system receives second text data representing the first response. In some embodiments, the second text data received by the backend system will come from an application within category server or skills server. The category server or skills server may be the same as, or within Category Servers/Skills 262 of FIG. 2 and the same description applies. In some embodiments, the second text data may represent the response to the sample request. For example, the backend system may receive second text data from the News application server. The second text data may represent the response to the sample audio "The mayor is talking today."

In some embodiments, the backend system may also receive instructions from the skill server. The instructions may indicate that the response to the sample audio is to be played in a specific voice type. In a non-limiting, exemplary embodiment, to enhance the experience of a sample, it may be preferable to play the sample audio request in one voice and the response in another voice. In this embodiment, the skill server may send along instructions that indicate the sample audio is to be output using a certain voice.

At step 422, the backend system generates the second audio data representing the second text data. Once the second text data has been received from a category server or a skills server, the second text data may be converted into audio data. The data is converted into audio data by executing TTS functionality on the second text data. The TTS functionality may be similar to Text-To-Speech 264 of FIG. 2, and the same description applies. Continuing the News application example, if the text data received by the News application server contains the response sample audio, the audio data may represent the following statement, "The mayor is talking today." In some embodiments, if the backend system has received instructions indicating that the response to the sample audio is to be output using a specific voice type, the text data may be converted into audio data representing a statement in the specific voice type. For example, the audio data representing "The mayor is speaking today," might be cued to play in a New York accent.

In some embodiments, the first audio data and the second audio data may be played using different voice types. Additionally the first audio data and the second audio data may be played using the same voice types. In some embodiments, the backend system may receive instructions to play the first audio data in a different voice than the second audio data. In this embodiment, it may only be necessary to send instructions regarding the first audio data.

At step 424, the backend system receives first display data. In some embodiments, the first display data received by the backend system will come from an application within category server or skills server. The category server or skills server may be the same as, or within Category Servers/Skills 262 of FIG. 2 and the same description applies. First display data, in some embodiments, may include text representing the first sample request. For example, the first display data may include the text "Alexa, tell News to tell me what is going on today." In some embodiments, the display data is stored locally. In some embodiments, step 424 may be omitted.

At step 426, the backend system receives second display data. In some embodiments, the second display data received by the backend system will come from an application within category server or skills server. The category server or skills server may be the same as, or within Category Servers/Skills 262 of FIG. 2 and the same description applies. Second display data, in some embodiments, may include text representing the first response. For example, the second display data may include the text "The mayor is talking today." In some embodiments, the display data is stored locally. In some embodiments, step 426 may be omitted.

At step 428, the backend system sends the first audio data to the electronic device. The first audio data, created using TTS functionality on the first text data, is transmitted to the electronic device. Step 424 may be similar to the transmission of audio file one 6a and the same description applies. After the first audio data is sent to the electronic device, the first audio data is output by one or more speakers of the electronic device. For example, continuing the News application example, the backend system may send the first audio data to the electronic device such that the electronic device plays "Alexa, tell News to tell me what is going on today." In some embodiments, the electronic device may play the first audio data in a specific voice type. For example, the electronic device may play "Alexa, tell News to tell me what is going on today," in a New York accent. Additionally, in some embodiments, the first audio data may be sent to a second electronic device such that "Alexa, tell News to tell me what is going on today," is played by the second electronic device.

At step 430, the backend system sends the first display data to the electronic device. Step 430 may be similar to the transmission of display data one 6b and the same description applies. After the first display data is sent to the electronic device, the first display data may be displayed by a display screen of the electronic device. The display screen in process 400 may be similar to display screen 14 and the same description applies. First display data may be displayed in a similar manner to first text invocation 12C, and the same description applies. In some embodiments, the display data is stored locally. In these embodiments, the first audio data may trigger a response in the electronic device that causes the electronic device to display the words being output by the electronic device. In some embodiments, the words being displayed may be highlighted as the audio data is being output by the electronic device. For example, when the word "Alexa" is output by the electronic device, the word "Alexa" being displayed on the electronic device may be highlighted. In some embodiments, step 430 may be omitted.

At step 432, the backend system sends the second audio data to the electronic device. The second audio data, created using TTS functionality on the second text data, is transmitted to the electronic device. Step 486 may be similar to the transmission of Audio file two 8*a* and the same description applies. After the second audio data is sent to the electronic device, the second audio data is output by one or more speakers of the electronic device. For example, continuing the News application example, the backend system may send the second audio data to the electronic device such that the electronic device plays "The mayor is talking today." In some embodiments, the electronic device may play the second audio data in a specific voice type. For example, the electronic device may play "The mayor is talking today," in a New York accent. Additionally, in some embodiments, the second audio data may be sent to a second electronic device such that "The mayor is talking today," is played by the second electronic device.

In some embodiments, once the first audio data and the second audio data has been sent, the backend system may receive text data representing a message. This message may be received from a skills/category server. In some embodiments, this message may represent confirmation that the sample has been played. For example, the backend system may receive text representing the following message, "Your sample has been played." The text data would then be converted to audio data by executing TTS on the text data. The audio data representing the confirmation message would then be sent to an electronic device such that the electronic device outputs the confirmation message on one more speakers of the electronic device. In some embodiments, this message may represent instructions on enablement of the application that has been sampled. For example, the backend system may receive text representing the following message, "You can enable the News skill by selecting enable on your device." The text data would then be converted to audio data by executing TTS on the text data. The audio data representing the instructions would then be sent to an electronic device such that the electronic device outputs the instructions on one more speakers of the electronic device. In some embodiments, this message may ask an individual if he or she would like to enable the sample. For example, the backend system may receive text representing the following message, "Would you like to enable the News skill?" The text data would then be converted to audio data by executing TTS on the text data. The audio data representing the question would then be sent to an electronic device such that the electronic device outputs the question on one more speakers of the electronic device. As used herein, TTS may be similar to TTS 264 of FIG. 2 and the same description applies.

At step 434 the backend system sends second display data to the electronic device. Step 434 may be similar to the transmission of display data two 8*b* and the same description applies. After the second display data is sent to the electronic device, the second display data may be displayed by a display screen of the electronic device. The display screen in process 400 may be similar to display screen 14 and the same description applies. Second display data may be displayed in a similar manner to first text response 12D, and the same description applies. In some embodiments, the display data is stored locally. In these embodiments, the second audio data may trigger a response in the electronic device that causes the electronic device to display the words being output by the electronic device. In some embodiments, the words being displayed may be highlighted as the audio data is being output by the electronic device. For example, when the word "mayor" is output by the electronic device, the word "mayor" being displayed on the electronic device may be highlighted. In some embodiments, step 434 may be omitted.

Figure 4B:
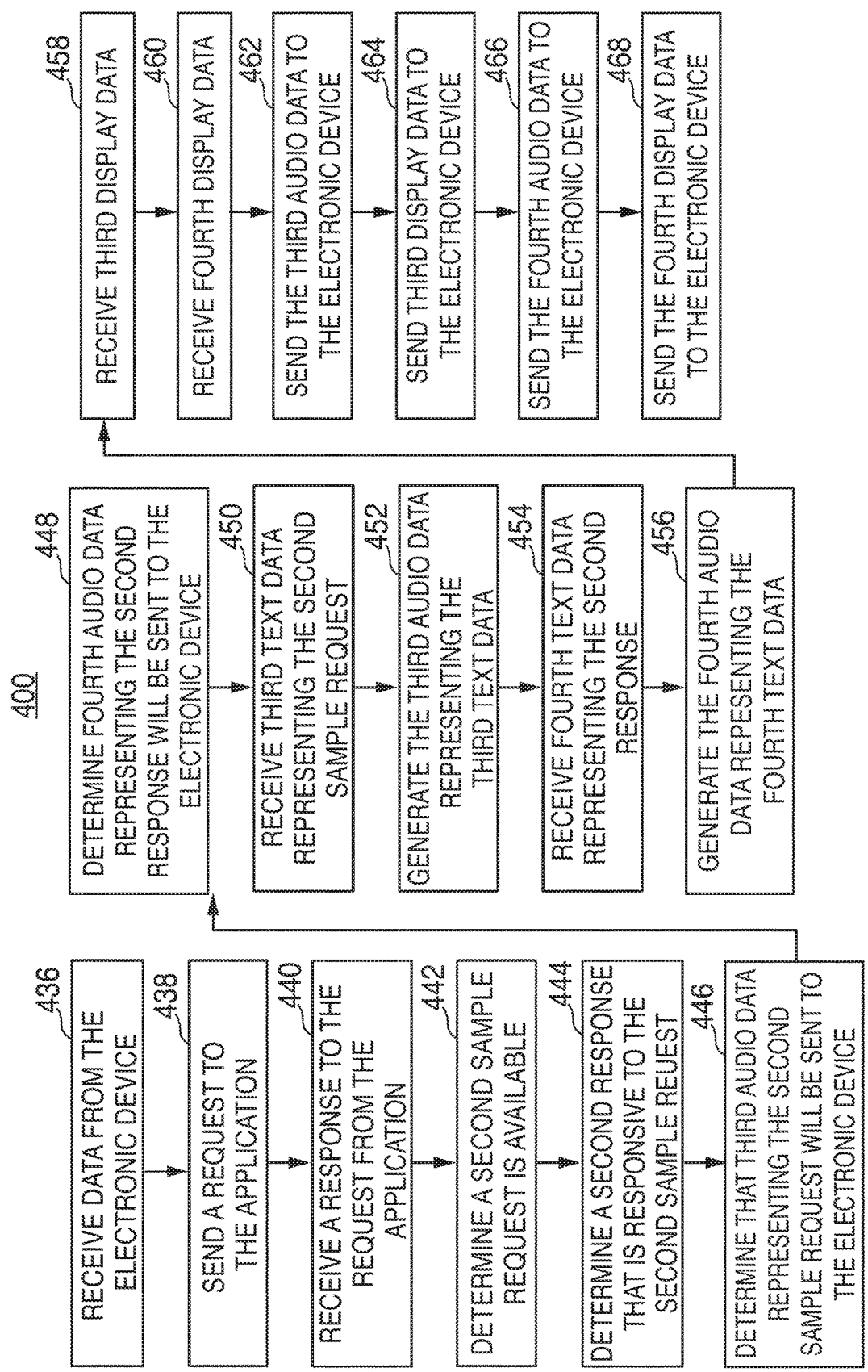
FIG. 4B is an illustrative flowchart continuing the process in FIG. 4A to receive another sample of a functionality of a backend system in accordance with various embodiments.

FIG. 4B is an illustrative flowchart continuing the process in FIG. 4A to receive another sample of a functionality of a backend system in accordance with various embodiments. Process 400 may continue, in some embodiments, with step 436. At step 436 the backend system receives data from the electronic device. This data, sent from the electronic device, may indicate to the backend system that the electronic device is still detecting a touch input. This data may be sent just after the second audio data is output on the electronic device. The data may be similar to Touch Input Data 26 and the same description applies. For example, after the electronic device outputs "The mayor is talking today," the electronic device may notice that a touch input is still being detected. If the electronic device continues to detect the touch input, the electronic device may send data indicating the touch input is still occurring to the backend system.

In some embodiments, the backend system determines that the electronic device is still detecting the touch input. Once the backend system receives the data from the electronic device, the backend system may recognize that the touch input is still occurring. This may be similar to the disclosure regarding Touch Input Data 26 and the same description applies. For example, after the electronic device outputs "The mayor is talking today," the electronic device sends data indicating the touch input is still occurring to the backend system. Once the data is received by the backend system, the backend system may determine that the touch input is still occurring.

At step 438, the backend system sends a request to a category server. After determining the touch input is still occurring, the backend system may recognize that the individual requesting the sample, would like to hear another sample. In order to meet that request for another sample, the backend system may need to send a request to a category/skills server in order to determine whether another sample is available. As used herein, the category/skills server may be similar to, or within Category Servers/Skills 262 and the same description applies. For example, continuing the News application example, the backend system may send a request to the News application server, asking whether another response is available. In some embodiments, the sample audio and responses are stored locally. In some embodiments, step 438 may be omitted.

At step 440, the backend system receives a response to the request from the category sever. Once the request has been sent to the category server, the category server may respond. The response received by the backend system may indicate whether another sample is available. If the category server response indicates that there is another sample, the process continues. If the category server response indicates that there are no more samples, the process would end here. If the process ends, the backend system may receive text data representing a message from the category server. The message may state "Sorry, there are no more samples." The text data would then be converted into audio data by executing TTS on the text data. The audio data would then be sent to the electronic device such that the electronic device outputs the message on one or more speakers of the electronic device. In some embodiments, the sample audio and responses are stored locally. In some embodiments, step 440 may be omitted.

At step 442, the backend system determines a second sample request is available. Once the backend system receives the response, it may determine what the response indicates. If the response is a positive response, the backend system may determine a second sample request is available. In some embodiments, the response may be a negative response. In this embodiment, the backend system may determine that a second response is not available. In some embodiments, the backend system may determine that a second sample request is available by searching text data representing stored sample requests. In some embodiments, the backend system may determine that a second response is also available. In some embodiments, step 442 may be omitted.

At step 444, the backend system determines a second response that is responsive to the second sample request. Step 444 may be similar to step 410 and the same description applies. After determining a second sample request is available, the backend system may then find a response to the second sample request. The backend system may determine this response by receiving the response from the category server. For example, the News application server may send a response "Alexa, ask News what was the news yesterday," the News application server may send a confidence score representing the response stating "The mayor spoke yesterday." In some embodiments, the response to the sample request may be stored with the sample request.

At step 446, the backend system determines that third audio data representing the second sample request will be sent to the electronic device. Step 446 may be similar to step 412 and the same description applies. Because a second sample has been requested, the backend system may determine that the second sample will be played by the electronic device. This may allow an individual to learn and experience how a specific skill or application works. For example, the backend system may determine that the sample audio "Alexa, tell News to tell me what was the news yesterday," will be output by the electronic device. In some embodiments, step 446 may be omitted.

In some embodiments, the backend system may determine that the second statement will be sent to a second electronic device. The second electronic device, may be, but is not limited to, a voice activated electronic device. In order to determine that audio files should be sent to the second electronic device, the backend system may need to receive a customer identification number associated with the electronic device. The backend system may then find a user account associated with the customer identification number. Once the user account is located, the backend system may search for electronic devices associated with the electronic device. The backend system may find the second electronic device is associated with the electronic device. In some embodiments, the backend system may determine that the second electronic device may receive the second statement.

At step 448, the backend system determines that fourth audio data representing the second response will be sent to the electronic device. Step 448 may be similar to step 414 and the same description applies. After determining the third audio data representing the second sample request will be sent to an electronic device, the backend system may determine that the response will also be sent to the electronic device. This would allow an individual sampling an application to hear the sample request and a response to that sample request. For example, the backend system may determine that "The mayor spoke yesterday," will be sent and output by the electronic device after the electronic device outputs, "Alexa, tell News to tell me what was the news yesterday." In some embodiments, the backend system may determine that the response might be sent to a second electronic device. In some embodiments, step 448 may be omitted.

At step 450, the backend system receives third text data representing the second sample request. Step 450 may be similar to step 416 and the same description applies. In some embodiments, the text data received by the backend system will come from a category server or skills server. The category server or skills server may be the same as, or within Category Servers/Skills 262 of FIG. 2 and the same description applies. In some embodiments, the third text data may represent the second sample request. For example, the backend system may receive third text data from the News application server. The third text data may represent the second sample audio "Alexa, tell News to tell me what was the news yesterday."

In some embodiments, the backend system may also receive instructions from the skill server. The instructions may indicate that the sample audio is to be played in a specific voice type. In some embodiments, voice types may differ in frequency spectrums. For example, one voice type may be in a frequency spectrum ranging from 1000 Hz to 2000 Hz. A second voice type may be in a frequency spectrum ranging from 2100 Hz to 2800 Hz. While only two different frequency spectrum ranges are given, persons having ordinary skill in the art will recognize that any frequency range may be used and only two were used for exemplary purposes. Additionally, in some embodiments, voice types may have different tones. In some embodiments, voice types may have different tones and frequency spectrums. In a non-limiting, exemplary embodiment, to enhance the experience of a sample, it may be preferable to play the sample audio request in one voice and the response in another voice. In this embodiment, the skill server may send along instructions that indicate the sample audio is to be output using a certain voice.

At step 452, the backend system generates the third audio data representing the third text data. Step 452 may be similar to step 418 and the same description applies. Once the third text data has been received from a category server or a skills server, the third text data may be converted into audio data. The data is converted into audio data by executing TTS functionality on the third text data. The TTS functionality may be similar to Text-To-Speech 264 of FIG. 2, and the same description applies. Continuing the News application example, if the text data received by the News application server represents the second sample audio, the audio data may represent the following statement, "Alexa, tell News to tell me what the news was yesterday." In some embodiments, if the backend system has received instructions indicating that the sample audio is to be output using a specific voice type, the text data may be converted into audio data representing a statement in the specific voice type. For example, the audio data representing "Alexa, tell News to tell me what the news was yesterday," might be cued to play in a New York accent.

At step 454, the backend system receives fourth text data representing the second response. Step 454 may be similar to step 420 and the same description applies. In some embodiments, the fourth text data received by the backend system will come from a category server or skills server. The category server or skills server may be the same as, or within Category Servers/Skills 262 of FIG. 2 and the same description applies. In some embodiments, the fourth text data may represent the response to the sample request. For example, the backend system may receive fourth text data from the News application server. The fourth text data may represent the response to the sample audio "The mayor talked yesterday."

At step 456, the backend system generates the fourth audio data representing the fourth text data. Step 456 may be similar to step 422 and the same description applies. Once the fourth text data has been received from a category server or a skills server, the fourth text data may be converted into audio data. The text data is converted into audio data by executing TTS functionality on the fourth text data. The TTS functionality may be similar to Text-To-Speech 264 of FIG. 2, and the same description applies. Continuing the News application example, if the text data received by the News application server contains the response to the second sample audio, the audio data may represent the following statement, "The mayor talked yesterday." In some embodiments, if the backend system has received instructions indicating that the response to the sample audio is to be output using a specific voice type, the text data may be converted into audio data representing a statement in the specific voice type. For example, the audio data representing "The mayor talked yesterday," might be cued to play in a New York accent.

At step 458, the backend system receives third display data. In some embodiments, the third display data received by the backend system will come from an application within category server or skills server. The category server or skills server may be the same as, or within Category Servers/Skills 262 of FIG. 2 and the same description applies. Third display data, in some embodiments, may include text representing the second sample request. For example, the first display data may include the text "Alexa, tell News to tell me what the news was yesterday." In some embodiments, the display data may be stored locally on the electronic device. In some embodiments, step 458 may be omitted.

At step 460, the backend system receives fourth display data. In some embodiments, the fourth display data received by the backend system will come from an application within category server or skills server. The category server or skills server may be the same as, or within Category Servers/Skills 262 of FIG. 2 and the same description applies. Fourth display data, in some embodiments, may include text representing the second response. For example, the second display data may include the text "The mayor is talked yesterday." In some embodiments, the display data may be stored locally on the electronic device. In some embodiments, step 460 may be omitted.

At step 462, the backend system sends the third audio data to the electronic device. Step 462 may be similar to step 428 and the same description applies. The third audio data, created using TTS functionality on the third text data, is transmitted to the electronic device. Step 454 may be similar to the transmission of audio file three 28a and the same description applies. After the third audio data is sent to the electronic device, the third audio data is output by one or more speakers of the electronic device. For example the backend system may send the first audio data to the electronic device such that the electronic device plays "Alexa, tell News to tell me what the news was yesterday." In some embodiments, the electronic device may play the third audio data in a specific voice type. For example, the electronic device may play "Alexa, tell News to tell me what the news was yesterday," in a New York accent. Additionally, in some embodiments, the third audio data may be sent to a second electronic device such that "Alexa, tell News to tell me what the news was yesterday," is played by the second electronic device.

At step 464, the backend system sends the third display data to the electronic device. Step 464 may be similar to the transmission of display data three 28b and the same description applies. After the third display data is sent to the electronic device, the third display data may be displayed by a display screen of the electronic device. The display screen in process 400 may be similar to display screen 14 and the same description applies. Third display data may be displayed in a similar manner to second text invocation 32C, and the same description applies. In some embodiments, the display data is stored locally. In these embodiments, the first audio data may trigger a response in the electronic device that causes the electronic device to display the words being output by the electronic device. In some embodiments, the words being displayed may be highlighted as the audio data is being output by the electronic device. For example, when the word "Alexa" is output by the electronic device, the word "Alexa" being displayed on the electronic device may be highlighted. In some embodiments, step 464 may be omitted.

At step 466, the backend system sends the fourth audio data to the electronic device. Step 466 may be similar to step 432 and the same description applies. The third audio data, created using TTS functionality on the third text data, is transmitted to the electronic device. Step 466 may be similar to the transmission of audio file four 30a and the same description applies. After the fourth audio data is sent to the electronic device, the fourth audio data is output by one or more speakers of the electronic device. For example, the backend system may send the fourth audio data to the electronic device such that the electronic device plays "The mayor talked yesterday." In some embodiments, the electronic device may play the fourth audio data in a specific voice type. For example, the electronic device may play "The mayor talked yesterday," in a New York accent. Additionally, in some embodiments, the fourth audio data may be sent to a second electronic device such that "The mayor talked yesterday," is played by the second electronic device.

At step 468 the backend system sends fourth display data to the electronic device. Step 466 may be similar to the transmission of display data four 30b and the same description applies. After the fourth display data is sent to the electronic device, the fourth display data may be displayed by a display screen of the electronic device. The display screen in process 400 may be similar to display screen 14 and the same description applies. Fourth display data may be displayed in a similar manner to second text response 32D, and the same description applies. In some embodiments, the display data is stored locally. In these embodiments, the first audio data may trigger a response in the electronic device that causes the electronic device to display the words being output by the electronic device. In some embodiments, the words being displayed may be highlighted as the audio data is being output by the electronic device. For example, when the word "mayor" is output by the electronic device, the word "mayor" being displayed on the electronic device may be highlighted. In some embodiments, step 468 may be omitted.

In some embodiments, the electronic device might continue to detect the touch input. If this is the case, additional data may be sent to the backend system and the process in FIG. 4B would start again. In some embodiments, there might be no more samples. If this is the case, the backend system may receive text data representing a message. This message may be received from a skills/category server. In some embodiments, this message may represent notice that there are no more samples to be played. For example, the backend system may receive text representing the following message, "There are no more samples." The text data would then be converted to audio data by executing TTS on the text data. The audio data representing the message would then be sent to an electronic device such that the electronic device outputs the message on one more speakers of the electronic device.

Figure 5:
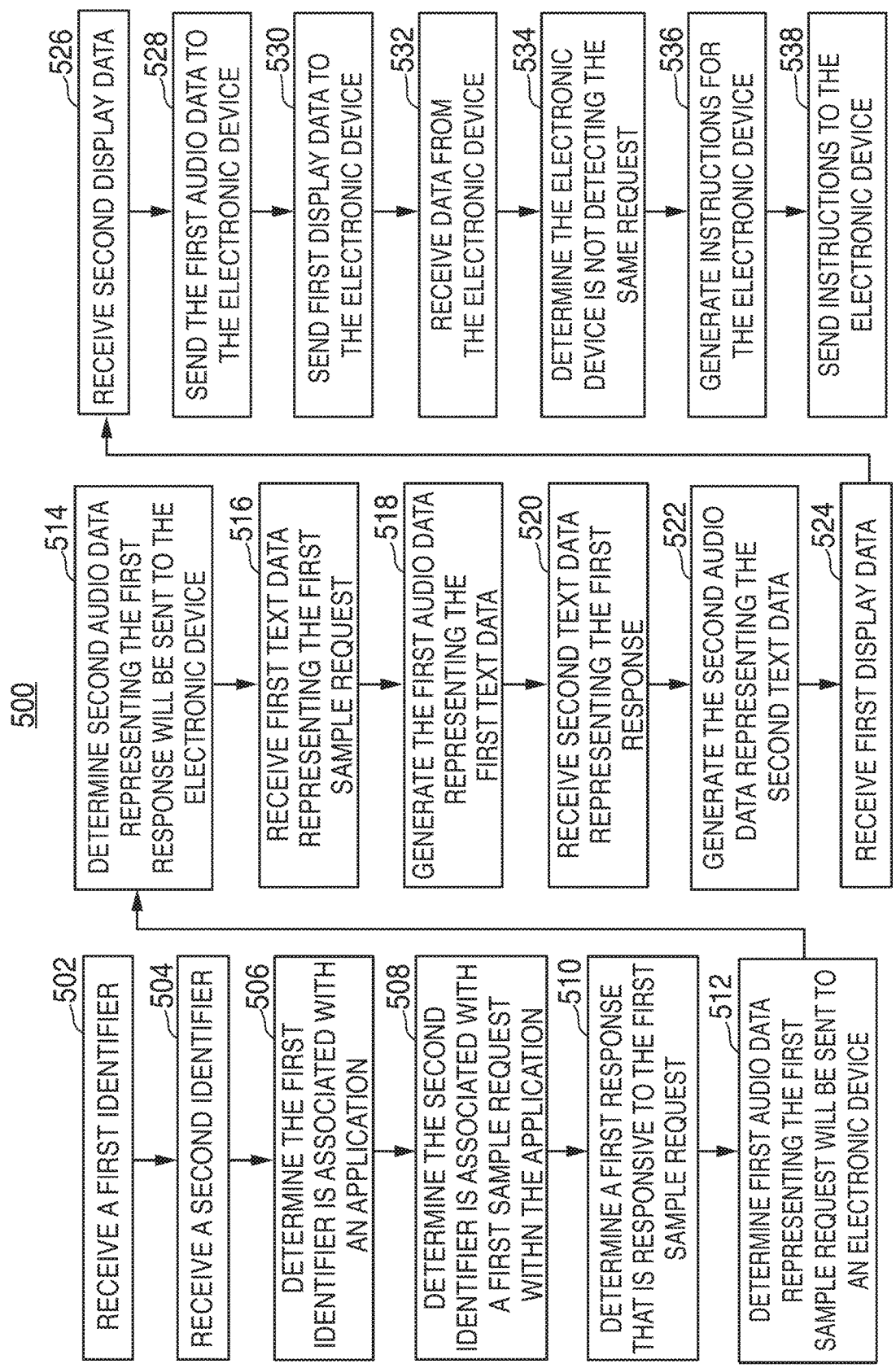
FIG. 5 is an illustrative flowchart of a process for stopping a sample of a functionality of a backend system in accordance with various embodiments.

FIG. 5 is an illustrative flowchart of a process for stopping a sample of a functionality of a backend system in accordance with various embodiments. Application, as used in process 500, refers to a functionality of the backend system. The backend system of process 500 may be similar to backend system 100 and the same description applies. Persons of ordinary skill will recognize that some steps in process 500 may be omitted or rearranged. Process 500 may, in some embodiments, begin at step 502. At step 502, the backend system receives a first identifier. The first identifier sent from an electronic device to the backend system in step 502 may indicate a skill or application that an individual has selected. Step 502 may be similar to step 402 and the same description applies. For example, an individual may want to sample a news application entitled "News." The first identifier, in some embodiments, may include a skill identification number. The first identifier might be a string of characters including numbers, letters or a combination thereof. In some embodiments, the skill identification number. For example, the first identifier for the application News may be "002A." The first identifier may be similar to Skill ID/Sample Audio ID 4 and the same description applies. The electronic device may be similar to electronic device 10 and the same description applies.

In some embodiments the backend system determines the first identifier was sent in response to a touch input. In some embodiments, when the backend system receives an identifier indicating a selected skill, the backend system may recognize that the identifier was sent in response to a touch input. The touch input may be similar to touch input 2 and the same description applies.

At step 504, the backend system receives a second identifier. Step 504 may be similar to step 404 and the same description applies. The second identifier may indicate a sample audio request within the selected skill. For example, the sample selected by the user may have a specific statement. For example, the sample may be "Alexa, tell News to tell me what is going on today." The statement may be similar to statement 18 and the same description applies. The second identifier may, in some embodiments, contain a sample audio identification number. This identifier may be a string of characters including numbers, letters or a combination thereof. For example, "Alexa tell News to tell me what is going on today," may have an identifier "002A-1." The second identifier may be similar to Skill ID/Sample Audio ID 4 and the same description applies. In some embodiments, step 504 may be omitted.

At step 506, the backend system determines the first identifier is associated with an application. Step 506 may be similar to step 406 and the same description applies. After receiving the first identifier, the backend system may then try to match the identifier to a specific application. The backend system may use a skills server to determine which skill was selected. The skills server used herein may be similar to Category Servers/Skills 262 and the same description applies. The skills server may have a list of skills, each skill within the list having a predetermined identifier. The backend system may then compare each skill identifier to a list of skills stored in the skills/category server.

At step 508, the backend system determines the second identifier is associated with a first sample request within the application. Step 508 may be similar to step 408 and the same description applies. Once a skill or application has been matched to the first identifier, the backend system may then search for an invocation within the matched skill or application. In some embodiments, the match is sent to the backend system. Once a match is found, the backend system determines a sample request within the application associated with the second identifier. In some embodiments, step 508 may be omitted.

At step 510, the backend system determines a first response that is responsive to the first sample request. Step 510 may be similar to step 410 and the same description applies. Once the backend system determines the first sample request, the backend system may then determine a response to the first sample request. The backend system may determine this response by receiving the response from the category server. In some embodiments, the backend system may determine the correct response by receiving a plurality of responses and determining which of the plurality of responses is correct. In some embodiments, the response to the sample request may be stored with the sample request. In some embodiments, step 510 may be omitted.

At step 512, the backend system determines first audio data representing the first sample request will be sent to an electronic device. Step 512 may be similar to step 412 and the same description applies. In process 500, the backend system receives an identifier, indicating that a sample has been selected. Because a sample has been selected, the backend system may determine that the audio generally causing the backend system to find a response, will be played by the electronic device. This may allow an individual to learn and experience how a specific skill or application works. For example, the backend system may determine that the sample audio "Alexa, tell News to tell me what is going on today," will be output by the electronic device. In some embodiments, step 512 may be omitted.

At step 514, the backend system determines second audio data representing the first response will be sent to the electronic device. Step 514 may be similar to step 414 and the same description applies. Once the backend system has determined the first audio data will be sent to the electronic device, the backend system may also determine that second audio data representing a response will also be sent to the electronic device. This would allow an individual sampling an application to hear the sample request and a response to that sample request. For example, the backend system may determine that "The mayor spoke today," will be sent and output by the electronic device after the electronic device outputs, "Alexa, tell News to tell me what is going on today." In some embodiments, as with step 512, the backend system may determine that the response might be sent to a second electronic device. Furthermore, in some embodiments, the backend system may determine that the sample request may be sent to the electronic device and the response may be sent to the second electronic device. In some embodiments, step 514 may be omitted.

At step 516, the backend system receives first text data representing the first sample request. Step 516 may be similar to step 416 and the same description applies. In some embodiments, the text data received by the backend system will be sent from a category server or skills server. The category server or skills server may be the same as, or within Category Servers/Skills 262 of FIG. 2 and the same description applies. In some embodiments, the first text data may represent the first sample request. For example, the backend system may receive first text data from the News application server. The first text data may represent the sample audio "Alexa, tell News to tell me what is going on today."

In some embodiments, the backend system may also receive instructions from the skill server. The instructions may indicate that the sample audio is to be played in a specific voice type. In a non-limiting, exemplary embodiment, to enhance the experience of a sample, it may be preferable to play the sample audio request in one voice and the response in another voice. In this embodiment, the skill server may send along instructions that indicate the sample audio is to be output using a certain voice.

At step 518, the backend system generates first audio data representing the first text data. Step 518 may be similar to step 418 and the same description applies. Once the first text data has been received from a category server or a skills server, the first text data may be converted into audio data. The data is converted into audio data by executing TTS functionality on the first text data. The TTS functionality may be similar to Text-To-Speech 264 of FIG. 2, and the same description applies. For example, if the text data received by a News application server contains the sample audio, the audio data may represent the following statement, "Alexa, tell News to tell me what is going on today." In some embodiments, if the backend system has received instructions indicating that the sample audio is to be output using a specific voice type, the text data may be converted into audio data representing a statement in the specific voice type. For example, the audio data representing "Alexa, tell News to tell me what is going on today," might be cued to play in a New York accent.

At step 520, the backend system receives second text data representing the first response. Step 520 may be similar to step 420 and the same description applies. In some embodiments, the second text data received by the backend system will be sent from a category server or skills server. The category server or skills server may be the same as, or within Category Servers/Skills 262 of FIG. 2 and the same description applies. In some embodiments, the second text data may represent the response to the first sample request. For example, the backend system may receive second text data from the News application server. The second text data may represent the response to the sample audio "The mayor is talking today."

In some embodiments, the backend system may also receive instructions from the skill server. The instructions may indicate that the response to the sample audio is to be played in a specific voice type. In a non-limiting, exemplary embodiment, to enhance the experience of a sample, it may be preferable to play the sample audio request in one voice and the response in another voice. In this embodiment, the skill server may send along instructions that indicate the sample audio is to be output using a certain voice.

At step 522, the backend system generates the second audio data representing the second text data. Step 522 may be similar to step 422 and the same description applies. Once the second text data has been received from a category server or a skills server, the second text data may be converted into audio data. The data is converted into audio data by executing TTS functionality on the second text data. The TTS functionality may be similar to Text-To-Speech 264 of FIG. 2, and the same description applies. For example, if the text data received by a News application server contains the response sample audio, the audio data may represent the following statement, "The mayor is talking today." In some embodiments, if the backend system has received instructions indicating that the response to the sample audio is to be output using a specific voice type, the text data may be converted into audio data representing a statement in the specific voice type. For example, the audio data representing "The mayor is speaking today," might be cued to play in a New York accent.

At step 524, the backend system receives first display data. In some embodiments, the first display data received by the backend system will come from an application within category server or skills server. The category server or skills server may be the same as, or within Category Servers/Skills 262 of FIG. 2 and the same description applies. First display data, in some embodiments, may include text representing the first sample request. For example, the first display data may include the text "Alexa, tell News to tell me what is going on today." In some embodiments, the display data may be stored locally on the electronic device. In some embodiments, step 524 may be omitted.

At step 526, the backend system receives second display data. In some embodiments, the second display data received by the backend system will come from an application within category server or skills server. The category server or skills server may be the same as, or within Category Servers/Skills 262 of FIG. 2 and the same description applies. Second display data, in some embodiments, may include text representing the first response. For example, the second display data may include the text "The mayor is talking today." In some embodiments, the display data may be stored locally on the electronic device. In some embodiments, step 526 may be omitted.

At step 528, the backend system sends the first audio data to the electronic device. Step 528 may be similar to step 428 and the same description applies. The first audio data, created using TTS functionality on the first text data, is transmitted to the electronic device. Step 526 may be similar to the transmission of audio file one 6a and the same description applies. After the first audio data is sent to the electronic device, the first audio data is output by one or more speakers of the electronic device. For example, the backend system may send the first audio data to the electronic device such that the electronic device plays "Alexa, tell News to tell me what is going on today." In some embodiments, the electronic device may play the first audio data in a specific voice type. For example, the electronic device may play "Alexa, tell News to tell me what is going on today," in a New York accent. Additionally, in some embodiments, the first audio data may be sent to a second electronic device such that "Alexa, tell News to tell me what is going on today," is played by the second electronic device.

At step 530, the backend system sends the first display data to the electronic device. Step 530 may be similar to the transmission of display data one 6b and the same description applies. After the first display data is sent to the electronic device, the first display data may be displayed by a display screen of the electronic device. The display screen in process 400 may be similar to display screen 14 and the same description applies. First display data may be displayed in a similar manner to first text invocation 12C, and the same description applies. In some embodiments, the display data is stored locally. In these embodiments, the first audio data may trigger a response in the electronic device that causes the electronic device to display the words being output by the electronic device. In some embodiments, the words being displayed may be highlighted as the audio data is being output by the electronic device. For example, when the word "Alexa" is output by the electronic device, the word "Alexa" being displayed on the electronic device may be highlighted. In some embodiments, step 530 may be omitted.

At step 532, the backend system receives data from the electronic device. This data, sent from the electronic device, may indicate to the backend system that the electronic device is no longer detecting an input causing the sample to occur. In some embodiments, this data may indicate a touch input is no longer occurring. This data may be sent just after the first audio data is output on the electronic device. In some embodiments, this data may be sent during the output of the first audio. The data may be similar to Data Indicating No Touch Input 302 and the same description applies. For example, after the electronic device outputs "Alexa, tell News to tell me what is going on today," the electronic device may notice that a touch input is no longer being detected. If the electronic device does not detect the touch input, the electronic device may send data indicating the touch input is not occurring to the backend system.

At step 534, the backend system determines the electronic device is not detecting the sample request. In some embodiments, the backend system determines that the backend system is no longer detecting a touch input. Once the backend system receives the data from the electronic device, the backend system may recognize that the sample should stop. This may be similar to the disclosure regarding Data Indicating No Touch Input 302 and the same description applies. For example, after the electronic device outputs "Alexa, tell News to tell me what is going on today," the electronic device sends data indicating the input no longer occurring to the backend system. Once the data is received by the backend system, the backend system may determine that the sample should stop.

At step 536, the backend system generates instructions for the electronic device. The stop instructions may be for the purposes of stopping the first audio data from being played by the electronic device. Stop instructions may direct the electronic device to stop the sample process entirely.

At step 538, the backend system sends the instructions to the electronic device. After generating the stop instructions, the backend system may then send the stop instructions to the electronic device causing the electronic device to stop outputting the first audio and to not play the second audio. The transmission of the stop instructions may be similar to Stop Instructions 304 and the same description applies. The stop instructions may also cause the second data to not be sent to the electronic device.

Figure 6:
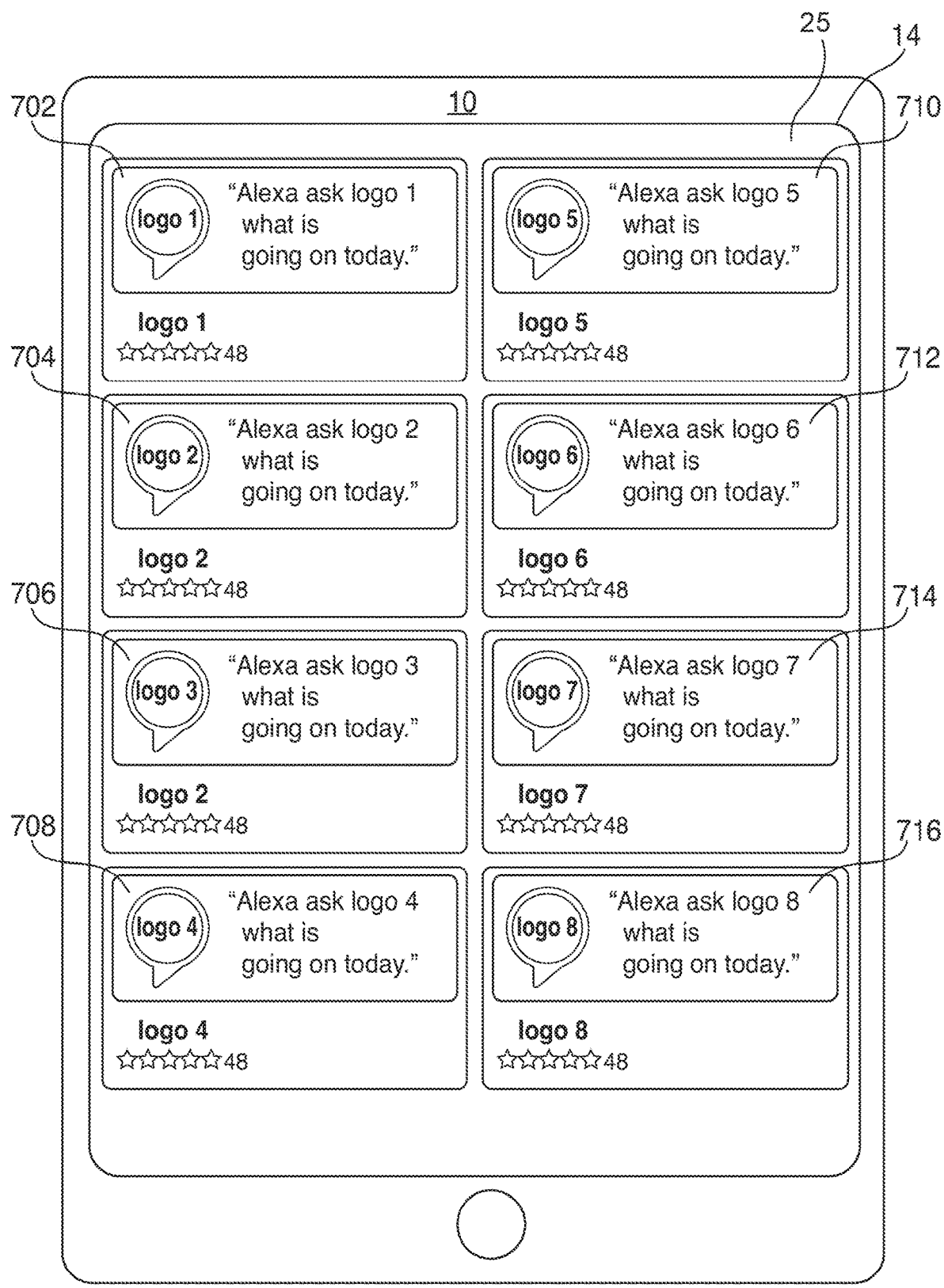
FIG. 6 is an illustrative diagram of an exemplary user interface showing multiple applications in accordance with various embodiments.

FIG. 6 is an illustrative diagram of an exemplary user interface showing multiple skills in accordance with various embodiments. Graphical user interface 25 may be, in some embodiments, shown on display screen 14 of electronic device 10. Displayed with graphical user interface 24 may be a list of skills. In some embodiments, skill one 702, skill two 704, skill three 706, skill four 708, skill five 710, skill six 712, skill seven 714, and skill eight 716 may be displayed on display screen 14. Each of the aforementioned skills may correspond to different skills that are capable of completing different tasks. In some embodiments, skill one 702, skill two 704, skill three 706, skill four 708, skill five 710, skill six 712, skill seven 714, and skill eight 716 may be similar to Daily Jokes 16 and the same description applies. Each skill can be individually selected and sampled. The sampling of a skill is described in more detail in FIGS. 4A, 4B, and 5 and the same descriptions apply.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method comprising:
sending, from a requesting device, a first identifier indicating a first preview invocation utterance to activate a first skill;
receiving, at an electronic device, the first identifier;
determining first text data representing the first preview invocation utterance;
associating the first preview invocation utterance with the first identifier such that the first preview invocation utterance corresponds to a first preview reply utterance to be output by the requesting device;
generating first audio data representing the first text data by performing text-to-speech processing on the first text data;
determining second text data representing the first preview reply utterance, corresponding to an example reply the electronic device is capable of generating in response to an example invocation;
generating second audio data representing the second text data by preforming the text-to-speech processing on the second text data;
sending the first audio data to the requesting device such that the first preview invocation utterance is output by the requesting device; and
sending the second audio data to the requesting device such that the first preview reply utterance is output by the requesting device after the first preview invocation utterance, allowing the first skill to be previewed by the requesting device.

2. The method of claim 1, further comprising:
receiving, prior to determining the first text data, a second identifier indicating that the first preview invocation utterance was selected to be previewed, the second identifier being received from the requesting device; and
determining, prior to generating the first audio data, that the first preview invocation utterance is associated with the second identifier such that selection of the first preview invocation utterance causes the first preview reply utterance to be selected.

3. The method of claim 1, further comprising:
determining, prior to generating the first audio data, a first digital voice of a first frequency spectrum to use for the first audio data, the first audio data being generated such that the first preview invocation utterance is played to sound as though spoken using the first digital voice; and determining, prior to generating the second audio data, a second digital voice of a second frequency spectrum to use for the second audio data, the second audio data being generated such that the first preview reply utterance is played to sound as though spoken using the second digital voice, the second frequency spectrum differing from the first frequency spectrum.

4. The method of claim 1, further comprising:
receiving, from the requesting device, data indicating a second request for a second sample of the first skill;
determining a second preview invocation utterance associated with the first identifier is available;
determining a second preview reply utterance associated with the first identifier is available;
receiving third text data representing the second preview invocation utterance associated with the first identifier;
generating third audio data representing the third text data by executing text-to-speech functionality on the third text data;
receiving fourth text data representing the second preview reply utterance associated with the first identifier;
generating fourth audio data representing the fourth text data by executing text-to-speech functionality on the fourth text data;
sending the third audio data to the requesting device such that the second preview invocation utterance is output by the requesting device; and
sending the fourth audio data to the requesting device such that the second preview reply utterance is output by the requesting device after the second preview invocation utterance.

5. A method comprising:
receiving, from a first device, a first identifier corresponding to a preview of a first skill of an electronic device, wherein a representation of the first identifier was selected from a displayed set of options on a graphical interface;
determining that the first identifier is associated with the first skill;
determining first text data representing a first invocation associated with initiating the first skill;
generating first audio data representing the first text data;
determining, second text data representing a first reply to the first invocation;
generating second audio data representing the second text data;
sending the first audio data to the first device such that first audio corresponding to the first audio data is output; and
sending the second audio data to the first device such that second audio corresponding to the second audio data is output after the first audio.

6. The method of claim 5, further comprising:
receiving, from the first device, a second identifier;
determining that the second identifier is associated with a second skill of the electronic device;
receiving third text data representing a second invocation associated with initiating the second skill;
generating third audio data representing the third text data;
determining fourth text data representing a second reply to the second invocation;
generating fourth audio data representing the fourth text data;
sending the third audio data to the first device such that third audio corresponding to the third audio data is output;

receiving first device data;
generating, based at least in part on the first device data, an instruction for the first device; and
sending, to the first device, the instruction such that the first device stops outputting the third audio and does not output the second reply.

7. The method of claim 5, further comprising:
receiving, from the first device, first device data;
determining a second invocation associated with the first identifier is available;
determining a second reply to the second invocation associated with the first identifier is available;
determining third text data representing the second invocation associated with initiating the first skill;
generating third audio data representing the third text data;
determining fourth text data representing the second reply to the second invocation;
generating fourth audio data representing the fourth text data;
sending the third audio data to the first device, such that the second invocation is output; and
sending the fourth audio data to the first device, such that the second reply is output after the first audio.

8. The method of claim 7, further comprising:
receiving, prior to sending the fourth audio data, second device data;
generating, based at least in part on the second device data, an instruction for the first device; and
sending, to the first device, the instruction such that the first electronic device stops outputting the second invocation and does not output the second reply.

9. The method of claim 5, further comprising:
determining, prior to generating the first audio data, first voice data for invocations, such that the first audio data is generated to be output using the first voice data; and
determining, prior to generating the second audio data, second voice data for replies to the invocations, such that the second audio data is generated to be output using the second voice data.

10. The method of claim 5, further comprising:
receiving, prior to determining the second text data, a second identifier from the first device; and
determining that the second identifier indicates that the first invocation is to be sent to the first device.

11. The method of claim 5, further comprising:
determining third text data;
generating third audio data representing the third text data; and
sending the third audio data to the first device such that third audio corresponding to the third audio data is output.

12. The method of claim 5, further comprising:
determining an account is associated with the first device;
determining a second device is also associated with the account;
determining third text data;
generating third audio data representing the third text data; and
sending the third audio data to the second device such that the third audio data is output.

13. An electronic device comprising:
communications circuitry;
memory; and
at least one processor operable to:
receive, using the communications circuitry, a first identifier from a first device corresponding to a preview of a first skill of the electronic device, wherein a representation of the first identifier was selected from a displayed set of options on a graphical interface;

determine that the first identifier is associated with the first skill;

determine first text data representing a first invocation associated with initiating the first skill;

generate first audio data representing the first text data;

determine second text data representing a first reply to the first invocation;

generate second audio data representing the second text data;

cause the communications circuitry to send the first audio data to the first device, such that first audio corresponding to the first invocation is output by the first device; and cause the communications circuitry to send the second audio data to the first device, such that second audio corresponding to the first reply is output by the first device.

14. The electronic device of claim 13, wherein the at least one processor is further operable to:

receive, using the communications circuitry, a second identifier from the first device;

determine that the second identifier is associated with a second skill;

determine third text data representing a second invocation associated with initiating the second skill;

generate third audio data representing the third text data;

determine fourth text data representing a second reply to the second invocation;

generate fourth audio data representing the fourth text data;

cause the communications circuitry to send the third audio data to the first device, such that third audio corresponding to the second invocation is output;

receive, using the communications circuitry, data from the first device;

generate, based at least in part on the data, an instruction for the first device; and cause the communications circuitry to send, to the first device, the instruction such that the first device stops outputting the second audio and does not output the second reply.

15. The electronic device of claim 13, wherein the at least one processor is further operable to:

receive, using the communications circuitry, data;

determine that a second invocation associated with the first identifier is available;

determine a second reply to the second invocation associated with the first identifier is available;

determine third text data representing the second invocation associated with initiating the first skill;

generate third audio data representing the third text data;

determine fourth text data representing the second reply to the second invocation;

generate fourth audio data representing the fourth text data;

cause the communications circuitry to send the third audio data to the first device, such that the second invocation is output; and cause the communications circuitry to send the fourth audio data to the first device, such that the second reply is output.

16. The electronic device of claim 13, wherein the at least one processor is further operable to:

determine first voice data for invocations, such that the first audio data is generated to be output using the first voice data; and determine second voice data for replies to the invocations, such that the second audio data is generated to be output using the second voice data.

17. The electronic device of claim 13, wherein the at least one processor is further operable to:

receive, using the communications circuitry, a second identifier from the first device; and determine that the second identifier indicates that the first invocation is to be sent to the first device.

18. The electronic device of claim 13, wherein the at least one processor is further operable to:

determine third text data;

generate third audio data representing the third text data; and cause the communications circuitry to send the third audio data to the first device such that third audio corresponding to the third audio data is output.

19. The electronic device of claim 13, wherein the at least one processor is further operable to:

determine an account is associated with the first device;

determine a second device is also associated with the account;

determine third text data;

generate third audio data representing the third text data; and cause the communications circuitry to send the third audio data to the second device such that the third audio data is output.

* * * * *